(12) United States Patent
Hustvedt et al.

(10) Patent No.: US 6,375,719 B1
(45) Date of Patent: *Apr. 23, 2002

(54) METHODS FOR AIR HANDLING IN BUILDINGS AND CLEAN ROOMS

(75) Inventors: David C. Hustvedt, Boulder; James T. Bauder, Longmont, both of CO (US)

(73) Assignee: Acoustiflo, LLC, Boulder, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/352,243

(22) Filed: Jul. 13, 1999

Related U.S. Application Data

(62) Division of application No. 08/822,587, filed on Mar. 20, 1997, now Pat. No. 5,922,095.

(51) Int. Cl.$^7$ .............................................. B01D 46/00
(52) U.S. Cl. ....................... 95/273; 55/385.1; 55/385.2; 55/418; 55/467; 454/187
(58) Field of Search ..................... 454/187; 55/385.1, 55/385.2, 383, 418, 338, 467, 470, 471; 95/273

(56) References Cited

U.S. PATENT DOCUMENTS

| | | | |
|---|---|---|---|
| 2,823,656 A | 2/1958 | Dolza | 55/418 |
| 2,983,213 A | 5/1961 | Bohanon | 55/418 |
| 3,251,540 A | 5/1966 | Kinsworthy | 55/467 |

(List continued on next page.)

FOREIGN PATENT DOCUMENTS

| | | |
|---|---|---|
| DE | 3528590 A1 | 2/1987 |
| DE | 3538124 A1 | 4/1987 |
| JP | 3219-230 A | 6/1991 |
| JP | 3156-231 A | 7/1991 |

OTHER PUBLICATIONS

American Society Of Heating, Refrigerating And Air–Conditioning Engineers, 2001, Fundamentals Handbook, ASHRAE, Chapter 34, pp. 34.9, 34.17, 34.18.

Carrier System Design Manual, Carrier Corporation, 1960, Part 2, Air Distribution, Chapter 2, Air Duct Design, pp. 2–17.

Joy Series 2000, Axivane Fan, Model 66 33 1170—Total Pressure vs. Volume Flow, Sep. 10, 1973.

*Primary Examiner*—Duane S Smith
(74) *Attorney, Agent, or Firm*—Santangelo Law Offices, P.C.

(57) ABSTRACT

The present invention includes a system and method for air flow improvement in central air handling systems primarily for buildings and clean rooms. It may include a return flow path, a reversing element, an axial flow device, and a supply flow path where at least a portion of a supply flow path is substantially parallel to the return flow path and one of the flow paths at least partially surrounds the other flow path and could include an annulus between the supply and return flow paths and may provide uniform flow to the axial flow device. The system could include a filter which could be inclined, converging, or a skewed flow face filter, or combinations thereof. It may also include a coil, with a variety of shapes including flat, circular, or frustoconical and could be arranged perpendicular to a primary flow direction of the one or both of the flow paths. The system might also include at least one boundary layer affecting element. A remote access and replacement filter changing element may be included. To assist in turning the flows in such a system, possibly in combination with the reversing element, a conditioning element oriented at some angle to a primary flow direction and selected from a group consisting essentially of conditioning elements affecting filtration purity and temperature may be included. The above may be especially applicable to clean rooms and may include an air handling system for undivided and divided zones to filter the zone specific contaminants.

62 Claims, 19 Drawing Sheets

U.S. PATENT DOCUMENTS

| | | |
|---|---|---|
| 3,648,591 A | 3/1972 | Winnett ..................... 55/385.2 |
| 3,748,997 A | 7/1973 | Dean, Jr. et al. ................ 98/33 |
| 3,981,326 A | 9/1976 | Gorchev et al. ............ 137/604 |
| 4,090,857 A | 5/1978 | Ferri et al. .................... 55/338 |
| 4,100,964 A | 7/1978 | Gorchev et al. .............. 165/40 |
| 4,182,430 A | 1/1980 | Gorchev et al. ............ 181/224 |
| 4,191,543 A | 3/1980 | Peters ....................... 55/385.1 |
| 4,223,832 A | 9/1980 | Gorchev et al. .............. 236/49 |
| 4,295,416 A | 10/1981 | Gorchev et al. ................ 98/33 |
| 4,313,522 A | 2/1982 | Gorchev et al. ............ 181/224 |
| 4,319,521 A | 3/1982 | Gorchev et al. ................ 98/38 |
| 4,344,370 A | 8/1982 | Smith et al. ................ 110/162 |
| 4,418,788 A | 12/1983 | Gorchev et al. ............ 181/224 |
| 4,450,756 A | 5/1984 | Kling .......................... 55/467 |
| 4,530,272 A | 7/1985 | Stokes ...................... 55/385.2 |
| 4,662,912 A | 5/1987 | Perkins ........................ 55/467 |
| 4,699,640 A | 10/1987 | Suzuki et al. ............. 55/385 A |
| 4,747,857 A | 5/1988 | Andrews ................... 55/385.2 |
| 4,986,170 A | 1/1991 | Ramakrishnan et al. ..... 98/33.1 |
| 5,167,575 A | 12/1992 | Macdonald ................. 454/187 |
| 5,290,331 A | 3/1994 | Miles et al. ............... 55/385.2 |
| 5,522,767 A | 6/1996 | Bertsche et al. ............ 454/187 |
| 5,533,862 A | 7/1996 | Jung ......................... 415/220 |
| 5,922,095 A * | 7/1999 | Hustvedt et al. ............ 55/385.1 |

* cited by examiner

METHODS FOR AIR HANDLING IN BUILDINGS AND CLEAN ROOMS

This is a divisional application of application Ser. No. 08/822,587, filed Mar. 20, 1997, now issued as U.S. Pat. No. 5,922,095 and hereby incorporated by reference.

This invention relates to apparatus and methods for air handling systems for buildings and clean rooms and may include devices. Specifically, it relates to the use of fans in coaxial arrangements and includes associated equipment.

I. BACKGROUND

It is well known to distribute air from an air handling system to a main air supply duct to various branch ducts throughout a building. Such buildings may include what is commonly termed "clean rooms," of controlled purity environments. The air flows into the ventilated area and is generally returned via a central return duct back to the air handling system. Naturally, such system could include several systems running in like fashion.

The standard installation of an air handling system, for instance, to a building includes a return air chase or conduit located within the walls or even the floor of the building that extends up above the roof into a generally square or rectangular enclosure. Until the present invention, the square or rectangular enclosure was generally the preferred shape because of the ease of construction and design. Inside the square or rectangular enclosure generally are filter elements, cooling or heating coils, air baffles, noise reduction units, and so forth. Noteworthy, the vast majority of enclosed air handling systems use a centrifugal fan. The centrifugal fans generally have an efficiency of 50–60% and offer an advantage in making a 90 degree turn without the use of vanes and other devices. As an example, U.S. Pat. No. 3,748,997 to Dean, shows the typical installation of a centrifugal fan within a rectangular box. The return air from a central ducting system flows upward into a plenum, turns and then across coils, filters, and so forth, and into the inlet of the centrifugal fan. Outside air may be mixed with the return air (called "makeup air") as the needs of particular installation occur. The blades of the centrifugal fan force the air from the inlet out at a generally 90 degree angle into the supply air duct. Typically, ducting is used to distribute the air from the main supply flow path. Naturally, other combinations can occur. Furthermore, the air ventilation can be used in other aspects as well such as in ducted systems for refrigerated devices, appliances, and electrical instruments. The considerations in designing such a system include noise reduction, volumetric flow (dependent upon static pressure), air efficiency losses, pressure drops, and many other factors. As technology has improved and requirements of filtration heightened (especially in a clean room environment), new ways of performing the old tasks have been sought.

One of the ways in which new ways have been sought is the use of axial flow devices such as axial fans perhaps due to a smaller size, ease of flow control, and higher efficiency. However, while axial fans have been known for many years and find their application in various fields, the designers of central air handling systems have not sought the use of axial fans due to various complications. For instance, with the turns and angular orientations of a typical system, the rotating blades of an axial fan may encounter varying pressure differentials across the flow path. The axial flow fan design is relatively intolerant of unsymmetrical flows across the flow path. While a centrifugal fan, because of its design, generally would not be affected with such pressure differentials, the axial fan could be destroyed by, for instance, breaking a blade with various hazardous effects. Thus, prior to the invention, extensive damage can be done to even large and expensive systems by unsymmetrical flow paths such as a partially blocked filter, large struts, varying flows, and so forth.

Furthermore, a typical axial system, until the present invention, generally requires an extended length of the flow path entering the fan and even to some extent exiting the fan to assist in balancing the flows across the blades of an axial fan. Furthermore, the higher rotational speeds of axial fans may produce high frequency tones that may require careful acoustic design. On the other hand, centrifugal systems generally generate lower frequency noise. Historically, until the present invention, centrifugal fans and its known systems described above such as a square/rectangular enclosure with noise reduction equipment, tend to be more tolerant of non-uniform inlet flows than axial fans and may not require as careful of an acoustic design. For instance, the typical filtering system requires 500 feet per minute (FPM), yet a typical axial flow fan may operate around 3,000 FPM. Thus, the velocity at the filter must be decreased without significant distortion. For axial fans, this typically required lengthy straight duct sections in front of the fan to smooth out the distortion and nonuniformity. Again, this is not as important an issue with the centrifugal fan due to the inherent flow path in and through the centrifugal fan.

A hybrid of these airflow systems for buildings involves a "clean room." In clean rooms, high rates of flow are used to essentially purge the air throughout the room. Typically, the air enters a ceiling with a multitude of high efficiency filters, flows vertically at a relatively high flow rate into a floor grill and then is returned to the fan and related duct work. Interestingly, in clean room environments, because of the high flow rates required, multiple units are typically placed over a limited area. However, because of the typical size of air handling systems, this may have resulted in additional support structures and costs to support the extra weight that the present invention may not require. Also, the general state of the art appears to be that the multiple units' return flows are combined in the clean room as the flows enter through the floor grill and are returned to the units via a central collection system. For the clean room environment, multiple filters are used. Some filters are particulate filters. Other filters are chemical absorption filters because, in a given clean room, multiple contaminates may occur. Thus, a typical filter battery of a clean room environment may include a particulate filter and multiple chemical filters to filter the assorted chemicals. This obviously increases the expense with multiple chemicals. Furthermore, some chemical filters may become saturated earlier than other chemical filter elements. Thus, in some cases, the life of the filter element is shortened prematurely as the entire filter bank may be replaced.

In the clean room environment, if different zones are needed in a given clean room, the general state of the art is to divide by walls, partitions, shutters, and so forth, so that different classes of filtration can occur. An example is shown in U.S. Pat. No. 4,699,640 to Suzuki. In the Suzuki reference, the generally accepted philosophy is shown, that is, to divide and physically segregate certain clean air zones and filter the air through high efficiency particulate air filters. It would be convenient and less cumbersome to filter each zone, whether divided or undivided, for that zones' particular contaminant and in particular chemical contaminants.

Thus, while the higher efficiency of an axial fan has been long recognized, the practical ability of those skilled in the art to implement such a system has essentially not occurred until the present invention. Nonuniform flow, noise, high anal velocity, and extended entrance and exit configurations, and other complexities directed the typical air handling system designer and user to specify systems such as might be used on rooftops with centrifugal fans.

Prior to the present invention, no solution offered a combination of features that allowed the efficient and practical use of axial fans in resolving the above difficulties, especially in systems with close turns and without the ability to have lengthy straight duct sections in front of the fan. Actually, the development appeared to be away from the present invention because of the practical difficulties of using axial fans for such air ventilation systems.

Thus, there has been a long-felt unsatisfied need for the invention in allowing for the use of the higher efficiency of axial type flow devices, such as fans, and associated filtration equipment even though the needed implementing arts have long been available. Those skilled in the art appreciated that a problem existed and indeed were unable to arrive at a satisfactory solution. Substantial attempts were made by those skilled in the art, but such attempts failed to set aside the need because they failed to appreciate or understand the problem. Indeed, the prior efforts taught away from the technical direction of the present invention and the use of axial flow devices for air handling systems.

II. SUMMARY OF THE INVENTION

Accordingly, the present invention provides a unique system and method for an air handling system and associated equipment and in the preferred embodiment for using an axial flow device in typically a co-axial manner by reversing the flow through a reversing element. Additional aspects that appear to improve the performance relate to the use of filters and coils and an inclined manner of using the filters and coils to assist in turning of air flows, coils that surround an air intake to the fan and provide a pressure balancing effect and more uniform flow distribution, as well as a converging filter arrangement to assist in the filtration. The present invention also involves a localized filtration in a clean room of undivided zones with predetermined filtration characteristic needs. It may also involve localized chemical filtration of zones, whether divided or undivided.

More specifically, a goal of the present invention is to provide an air handling system including a return flow path for air to return to an air handling system through perhaps a return, a reversing element which is fluidicly connected to the return flow path, an axial flow device fluidicly connected to the reversing element and the return flow path, and a supply flow path where some portion of the supply flow path is at least partially surrounded by the return flow path and fluidicly connected to the flow device. Additionally, any of the following objects (and others) could be included. One object of this goal may be to provide a return flow path which substantially parallel to some portion of the supply flow path. Another goal may include providing at least a portion of a supply flow path located between symmetrical returns, which may include multiaxial returns. Another object of this goal may be to provide at least some portion of a supply flow path substantially enclosed by the return flow path. Another object of this goal is to provide substantially uniform flow of air in the proximity of an axial flow device and may include a uniform distribution of air across a fan blade. An object of this goal may be to provide a supply flow path substantially co-axial with the return flow path. An object of this goal may be to provide at least one filter fluidicly connected to the axial flow device to filter the air. Another object is to provide a filter inclined to a primary flow direction of at least one of the flow paths which may assist in changing flow direction of air from the primary flow direction to a turned flow direction. One object could include a converging filter which may be used as a separate object or in combination with inclining the filter to the primary flow direction. The converging filter may include a trapezoidal filter. Another object of this goal is to provide a filter which substantially fluidicly surrounds the axial flow device which may assist in establishing a substantially uniform air flow around the axial flow device. Likewise, an object is to provide a coil which also may substantially fluidicly surround the axial flow device. Another object is to provide a coil which may be oriented substantially perpendicular to the direction of a primary flow of both the return and supply flow path, if, for instance, the return and supply flow paths are parallel. Another object is to provide a coil which is frustoconical in that it has a smaller circumference at one end. Another object is to provide an axial flow device with adjustable pitch blades or variable rotational speed to alter flow efficiencies and flow rates. Another object is to provide a boundary layer affecting element fluidicly connected to at least one of the flow paths, which may include a flow splitter or a boundary layer opening or a combination thereof. Several boundary layer openings may be included and may be located or spaced about a perimeter of the supply flow path and could be located between the return flow path and the supply flow path, at, for instance, an interface between the flow paths. Such boundary layer opening could be adjustable and further might be adjustable automatically or remotely or both. Another object to this goal is to provide a remote access and replacement filter changing element which may include several subelements to change a plurality of filters from at least one centralized location. Such an arrangement could include locating filters in an annulus formed by the relative location of the return and supply flow paths. Such an arrangement could include what may be generally referred to as a lazy Susan arrangement. It could also include an arrangement where the filters are slidably moved around an annulus. The lazy Susan arrangement could include, for instance, a filter holder, a rolling element supporting the filter holder, a rolling element support, and a fastening element to fasten the rolling element support to the rest of the air handling system. Another object of this goal is to provide at least one conditioning element having at least a first and second flow surface where at least one of the flow surfaces is oriented at an angle to a direction of a primary flow of one of the flow paths, typically a return path, to aid in turning the flow where the conditioning element is selected from the group consisting essentially of conditioning elements affecting filtration purity and temperature, such as coils and filters. Such a conditioning element could include being placed in an annulus formed by the relative position of a return flow path and a supply flow path. Such use of a conditioning element could assist in establishing a more uniform flow of air. Naturally, the angle could be any angle such as acute, perpendicular, obtuse, or any other angle. Yet, another object of the present invention is to provide at least one skewed flow face filter in the system to assist in filtration and to assist in turning the flow at an intended turn in the flow. The skewed flow face filter may be a polysided, three dimensional configuration with a first and second flow face where the first flow face is skewed at an angle to the second flow face and may include a frame. Such a skewed flow face filter might be oriented substantially perpendicular in a primary direction of a return flow path and the second flow face might be oriented toward a turned direction of the return flow path. Another object might include varying the flow resistance across a cross sectional area of a varying flow resistance element selected from the group consisting essentially of flow resistance elements affecting filtration purity and temperature. The system might include a turning element which may act independently of the skewed flow face filter and may turn the air where the skewed flow face filter might assist in the turning. The second flow face might have substantially equal surface area from the first flow face. The air handling system could be used in conjunction with a clean room and could further include a clean room with undivided zones with a filtration system adapted to filter a predetermined first contaminant in the undivided zone where the first contaminant is different than a predetermined second contaminant in at least one other of the undivided zones of the clean room. Also, the air handling system could be used in conjunction with a clean room and could further include zones and a chemical filtration system adapted to filter a predetermined first chemical contaminant in the zone of the clean room wherein the first chemical contaminant is different than a predetermined second contaminant in at least one other of the zones. Another object of the present invention is to provide ease of maintenance using an axial fan. Another object is to provide a relatively lightweight and small footprint air ventilation system compared to the typically rectangular air ventilation systems using centrifugal fans. Other objects discussed in other goals apply to this goal as well.

Another goal of the present invention is to provide a method for handling air in an air handling system including the steps of returning air through a return flow path to an air handling system, reversing flow of the air into the supply flow path, flowing the air through an axial flow device, flowing the air through a supply flow path where at least a portion of the supply flow path is at least partially surrounded by the return flow path and fluidicly connected to the axial flow device. The objects under this goal could be similar to the above objects as would be naturally included or implied from the use of the above elements and would include as well objects from other goals classified below. Furthermore, the use of the remote access and replacement filter changing element might include the steps of moving the filter along a filter path through a centralized location, removing the filter, replacing the filter with a second filter, and moving the second filter to a filtering location.

Another goal of the present invention is to include an air handling system including a return flow path for air to return to an air handling system, a reversing element fluidicly connected to the return flow path, an axial flow device fluidicly connected to the reversing element, and a supply flow path where some portion of the return flow path is surrounded by the supply flow path and fluidicly connected to the axial flow device. Other objects as described herein could apply to this goal as well.

A further goal of the present invention is to provide an air handling system including a return flow path for air to return to an air handling system, a reversing element fluidicly connected to the return flow path, an axial flow device fluidicly connected to the reversing element and the return flow path, and a supply flow path where some portion of the supply flow path is substantially parallel with the return flow path and fluidicly connected to the axial flow device where one of the flow paths is surrounded by the other flow path. For instance, the return flow path could be surrounded by the supply flow path and vice versa. Additionally, the flow path could be substantially enclosed by the other flow path. Other objects described herein would apply to this goal as well. Furthermore, this and the other goals could include a ducting element fluidicly connected to at least one of the flow paths to assist in the flow of the air.

A further goal of the present invention is to provide a method of handling air in an air handling system including the steps of returning air through a return flow path to an air handling system, reversing flow of the air into a supply flow path, flowing the air through an axial flow device, flowing the air through a supply flow path where at least a portion of the supply flow path is aligned substantially parallel to the return flow path and fluidicly connected to the axial flow device, and surrounding some portion of one of the flow paths with the other flow path. Naturally, similar objects as described above could apply to this goal as well.

Another goal of the present invention is to provide a method of handling air in an air handling system including the steps of providing a return flow path for a flow of air to an air handling system, utilizing a reversing element affirmatively to reverse the flow direction of air into a supply flow path, providing an axial flow device in the supply flow path, aligning at least a portion of a supply flow path substantially parallel to the return flow path, fluidicly connecting the supply flow path to the axial flow device, and at least partially surrounding one of the flow paths with the other flow path. An object of this goal is to arrange the supply flow path between symmetrical returns. Another object is to arrange the supply flow path between multiaxial returns. Another object is to at least partially surround the supply flow path with the return flow path. Likewise, another object is to at least partially surround the return A flow path with the supply flow path. Another object is to substantially enclose a supply flow path with the return flow path. Another object is to substantially enclose the return flow path with the supply flow path. Another object is uniformly providing the flow of air to the axial flow device. Another object is to coaxially arrange the supply flow path with the return flow path. Another object is to fluidicly connect one filter to the axial flow device, which may be inclined, may be a converging filter, a trapezoidal filter, a skewed flow face filter, or combinations thereof as discussed herein. Another object is to fluidicly surround the axial flow device with a filter to assist in establishing uniform air flow to the axial flow device. Similarly, another object is to fluidicly surround the axial flow device with a coil to also assist in establishing uniform air flow to the axial flow device. Other objects similar to those described herein in the other goals could apply and could include the steps of locating, utilizing, arranging, adjusting, and orienting, as set forth in the claims and other areas or the patent.

A further goal of the present invention is to provide an air handling system including a return flow path to return the air to an air handling system, a plurality of converging filters to filter the air where the converging filters include a filter element media having a polysided, three dimensional configuration with at least three sides where the sides include at least two sides converging toward an intersection and at least one other side separating the two sides, a fan fluidicly connected to the return flow path, and a supply flow path to flow air out of the air handling system. One object of this goal could include providing a converging filter in the shape of a trapezoidal filter. Another object could include providing a trapezoidal filter to surround an annulus formed by the relative position of the return flow path and supply flow path. Another object of this goal is to orient the filters to substantially fluidicly surround the fan to assist in establishing a substantially uniform air flow to the fan. Another object is to incline the filters at an angle to the primary flow direction of at least one of the flow paths to assist in changing flow directions. Other objects of the present invention discussed herein apply to this goal as well.

A further goal of the present invention is to provide an air ventilation converging filter including filter element media, and a polysided, three dimensional configuration of the media having at least three sides where the sides include at least two sides converging toward an intersection and at least one other side separating the two sides and where the media and the polysided, three dimensional configuration combined to form a converging filter. An object of this goal is to provide a polysided, three dimensional frame, to hold the filter element media, and a restraining element where the frame, restraining element, and filter element media combine to form a framed, converging filter. One object of this goal is to adapt the converging filter to fit a cooperating frame in the air handling system where the cooperating frame is adapted to seal around the converging filter to minimize, for instance, air leaks. Another goal of the present invention is to provide a converging filter adapted to fit an annulus of the air handling system. Other objects described herein apply to this goal as well.

A further goal of the present invention is to provide an air ventilation skewed flow face filter including filter element media, and a poly-sided, three dimensional configuration with at least a first and second flow face where the first flow face is skewed at an angle to the second flow face, where the media and polysided, three dimensional configuration combined to form a skewed flow face filter. Other objects of this goal include those objects previously mentioned.

A further goal of the present invention is to provide a varying flow resistance element selected from a group consisting essentially of flow resistance elements affecting filtration purity and temperature. Such resistance may be varied for instance, by a change in thickness at certain sections in the flow stream or by resistance per cross sectional area or a combination.

Still a further goal of the present invention is to provide a pressure differential turning system for an air handling system, including a return flow path to return air to an air handling system at least one conditioning element having at least a first and second flow surface where at least one of the flow surfaces is oriented at an angle to a direction of primary flow of the return flow path to aid in turning the flow and where the conditioning element is selected from the group consisting essentially of conditioning elements affecting filtration purity and temperature, a fan to flow the air through the air handling system, and a supply flow path to supply the air handling system. One object of this goal is to provide a conditioning element including a filter where the filter surfaces may be oriented at an angle to aid in turning the flow at an intended turn in the flow. Such angle may be acute, obtuse, perpendicular, or other angle. Another object of this goal is to provide a conditioning element including a coil oriented at an angle for similar purposes. Another object is to provide a frustoconical coil. Another object is to provide a coil oriented perpendicular to the primary flow direction of the return flow path and supply flow path when, for instance, at least a portion of the return and supply flow paths are parallel. Another object is to provide a substantially uniform air flow. Other objects described herein apply here as well.

Another object of the present invention is to provide an air handling system including a return flow path to return air to the air handling system, a fan located in fluidic proximity to the return flow path, a supply flow path to supply air from the fan and fluidicly connected to the fan, and at least one non-ducted boundary layer opening in proximity to the supply flow path and fluidicly connected to the return flow path. One object is to provide the non-ducted boundary layer opening at a given axial location in the supply flow path. Another object is to locate the boundary layer openings between the return flow path and supply flow path and spaced around the perimeter of at least one of the flow paths. Another object is to provide openings which are adjustable, and may be automatically or remotely or any combination thereof. Another object is to locate the non-ducted boundary layer openings between the return and supply flow paths at an interface. A further object is to adjust the boundary layer opening which may affect the flow of the boundary layer. Another object is to automatically or remotely or any combination thereof adjust the boundary layer opening. A further object is to establish a boundary layer adjacent to an outer periphery of at least one of the flow paths, which may be the supply flow path. Other objects described herein apply to this goal as well.

Another goal to the present invention is to provide a remote filter changing system including a return flow path to return air to an air handling system, a plurality of filters to filter the air, a fan to flow the air through the air handling system, a supply flow path to filter the air from the air handling system, at least one centralized location to remotely access and replace the plurality of filters, and a remote access and replacement filter changing element to change a plurality of filters from the centralized location. One object is to further provide an advancing filter path element to move the filter to the centralized location which may include indexing the movement. Another object is to provide filters that are converging filters, which may be adapted to fit in an annulus formed by the relative position of the return and supply flow paths. Another goal is to provide a remote access and replacement filter changing element that may include a revolving lazy Susan arrangement. Another object is to provide a remote access and replacement filter changing element that includes a closed loop system. Other objects of other goals described herein apply here as well.

The above goals and objects can equally apply to a clean room environment and so a further goal of the present invention could be to apply any and all of the herein described goals and objects to the particular needs of a filtered clean room. For instance, one goal includes a filter and clean room including an enclosed space suitable for a clean room environment (such as controlled compositions), an air handling system fluidicly connected to the enclosed space, a return flow path for air to return to the air handling system, a reversing element fluidicly connected to the return flow path, an axial flow device fluidicly connected to the reversing element, a supply flow path where some portion of the supply flow path is substantially parallel to the return flow path and fluidicly connected to the axial flow device where one of the flow paths is at least partially surrounded by the other flow path, and a filter to filter that contaminates from the air fluidicly connected to the air handling system. Objects described herein such as the relative location of the supply flow path and return flow path, different filter arrangements, different coil arrangements, and so forth, would apply to the clean room as well.

Another goal of the present invention using a clean room relates to undivided zones. Thus, a goal is to provide a clean room undivided zoned air filtering system including a return flow path to return air to the air handling system, an air handling system to flow the air, a supply flow path to flow the air to at least one of a plurality of undivided zones of a clean room, and a filtration system adapted to filter a predetermined first contaminant in the undivided zone of the clean room where the first contaminate is different than a predetermined second contaminant in at least one other of the undivided zones of the clean room. Another object of this goal is to provide a second filtration system to filter a second undivided zone of the clean room that is adapted to selectively filter a predetermined second contaminant independently of the first contaminant. The contaminant may be a chemical contaminant. Another object is to provide an air handling system, the return flow path, and the supply flow path in a zone specific environment. Another object is to fluidicly connect the filtration system to a zoned return flow path so that filtration occurs from the undivided zone before air mingles with air from other zones. Another object is to fluidicly connect the filtration systems to a zoned supply flow path so that filtration occurs before air mingles with air from other zones. A further object may be to provide at least one cross-migration reduction element to reduce cross-migration of air from one undivided zone to another undivided zone in the clean room. The cross-migration reduction element may include a pressure balancing element. Another object is to provide a sufficient volume of air from the supply flow path to the undivided zone to assist in reduction of cross-migration of air from one undivided zone to another undivided zone. Other objects similar to those described herein may apply to this goal as well.

A further goal of the present invention is to include a zoned clean room air filtering system for chemical contaminants which may include an air handling system to flow air, and a return flow path to return the air to the air handling system, a supply flow path to flow the air to at least one of a plurality of zones of a clean room, and a chemical filtration system adapted to filter a predetermined first chemical contaminant in the zone of the clean room that is different than a predetermined second contaminant in at least one other of the zones. A primary object of this goal is to selectively chemically filter chemical contaminants specific to a zone, as opposed to the more general particulate contaminants. Another object is to provide a second filtration system to filter a second zone of the clean room that is adapted to selectively filter a predetermined second contaminant independently of the first contaminant. Another object is to localize the first contaminant to at least one divided zone. Another object is to include the air handling system, the return flow path and the supply flow path in a specific zone. Another goal is to fluidicly connect the filtration system through a zoned return flow path to filter the air from a zone before the air mingles with air from other zones. Another object is to fluidicly connect the filtration system to a zoned supply flow path to filter the air before the air mingles with air from other zones. Other objects of other goals described herein apply to these goals as well.

In supplying such a system, as shown in the preferred embodiment described above, it could generally include at least some of the following elements. First, it could include providing a return flow path and utilizing a reversing element to affirmatively reverse the flow direction of air into a supply flow path. It could also include providing an axial flow device in the supply flow path which could include an axial fan. As part of the system, the blade pitch or rotational speed of the axial flow device could be adjustable. It could include aligning at least a portion of a supply flow path substantially parallel to the return flow path, fluidicly connecting the supply flow path to the axial flow device and at least partially surrounding one of the flow paths with the other flow path. Such an arrangement could include arranging a supply flow path between symmetrical returns. It could also include arranging the supply flow path between multi-axial returns. Furthermore, it could include arranging the supply flow path and a return flow path to provide an annulus between the supply flow path and the return flow path. It could also include substantially enclosing one of the flow paths with the other flow path at a cross sectional section. It could also include coaxially arranging the supply flow path with the return flow path. Another feature is that it could include uniformly providing the flow to the axial flow device.

The system could also include locating at least one filter in fluidic connection with at least one of the flow paths. Typically, this could be the return flow path; however, it is not so restricted. Additionally, the filter could be inclined. The filter could be a converging filter which, in and of itself could be inclined. Such a shape could be trapezoidal. The arrangement of the filter could be that it fluidicly surrounds the fan such that flow from the filter may be more uniformly provided to the axial flow device. It could also include a coil. The coil could be a variety of shapes including circular or frustoconical. The coil could be arranged perpendicular to a primary flow direction of the return flow path. In the preferred embodiment, this may also include being perpendicular to the supply flow path. Alternatively, the coil could be inclined to a primary flow direction such as might be expected in a frustoconical coil arrangement.

The system might also include providing a boundary layer affecting element which could include a flow splitter, either singly or as a plurality of splitters, or providing a boundary layer opening or a combination thereof. A further feature of the system would include adjusting the boundary layer opening to adjust the boundary layer location about a perimeter of one of the flow paths. Such an adjustment could be provided as a remote adjustment or an automatic adjustment or some combination thereof.

Additionally, the system typically might include providing a plurality of filters around an annulus formed by the relative position of the supply flow path to the return flow path. Such an arrangement might also include a remote access and replacement filter changing element to change a plurality of filters from a centralized location. Such a design might include the ability to move the filter along a filter path to the centralized location, the ability to remove the filter, the ability to replace a filter with a second filter, and then the ability to move the second filter to a filtering location.

Another aspect of the system might include providing at least one conditioning element where the primary flow surface of the conditioning element is oriented at some angle, whether acute, perpendicular, obtuse, or another angle, to a direction of primary flow of one of the flow paths (typically the return flow path) to aid in turning the flow where the conditioning element is selected from a group consisting essentially of conditioning elements affecting filtration purity and temperature. Typically, such conditioning elements would include coils and filters and exclude deflectors, baffles, piping ells and tees. Such a system could also include orienting at least one filter at an angle to a primary flow direction of one of the flow paths, again typically the return flow path, to aid in turning the flow at an intended turn in the flow. Such a intended flow could take place at the reversing element shown at FIG. 1 as element (18) or even a turning element (53) shown in FIG. 27. The system could also include orienting at least one coil at some angle to the primary flow direction of a flow path, typically a return flow path, to aid in turning the flow at an intended turn in the flow. Naturally, such an angle could be any angle including acute, perpendicular, obtuse, and so forth. The system might include providing a frustoconical coil fluidicly connected to the axial flow device, such that the coil provided conditioning as well as provided some turning of the flow.

The system could also include providing additional air to the supply flow path such as makeup air (19) as shown in FIG. 1. Providing the makeup air at a certain position in the reversing element (18), as shown in FIG. 1, might additionally assist in affirmatively turning the flow direction of air toward the supply flow path (20).

The system might also include providing a skewed flow face filter and could include locating the filter in the proximity of a tuning element. Such a skewed flow face filter could include providing a first and second flow face where a first flow face might be at an angle to the second flow face, such angle including acute, perpendicular, or obtuse, zero, or other angles. The system could also include orienting the first flow face of skewed flow face filters substantially perpendicular to the flow path, typically, a return flow path. It could also include orienting the second flow face to a turned direction of air in the flow path. The system could also include orienting the first flow face at an angle to the flow path. The system could include providing a turning element in the air handling system and orienting a second flow face of the skewed flow face filter toward the turned direction of the turning element. The skewed flow face filter could also include providing substantially similar square areas of the first and second flow faces. The system could also include providing a skewed flow face filter in combination with a converging filter design, an inclined arrangement, or a combination thereof.

Naturally, other objects and goals of the present invention may be revealed in specification claims and drawings.

III. BRIEF DESCRIPTION OF THE DRAWINGS

Figure 16:
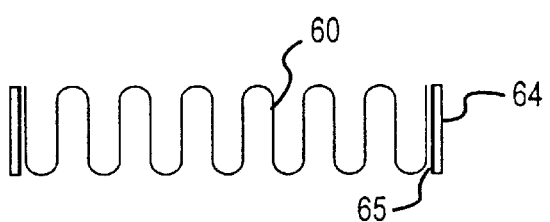

FIG. 16 includes a possible frame to hold the filter element media.

Figure 17:
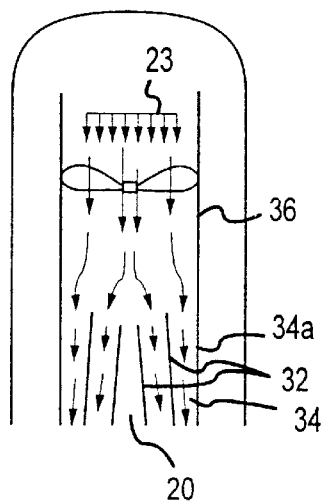

FIG. 17 shows a substantially uniform air distribution across the axial flow device; it also shows the use of boundary layer affecting elements and their effect on a boundary layer against a perimeter of one of the flow paths.

Figure 18:
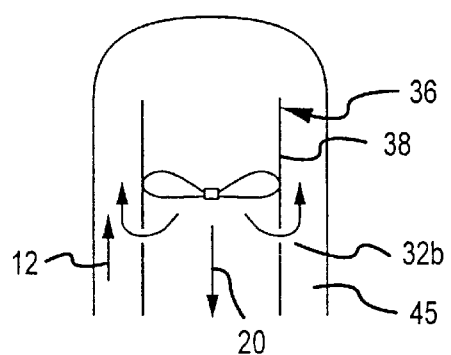

FIG. 18 shows an alternative embodiment of a boundary layer affecting element such as a boundary layer opening, which can, for example, be located at an interface between the supply flow path and return flow path.

Figure 19:
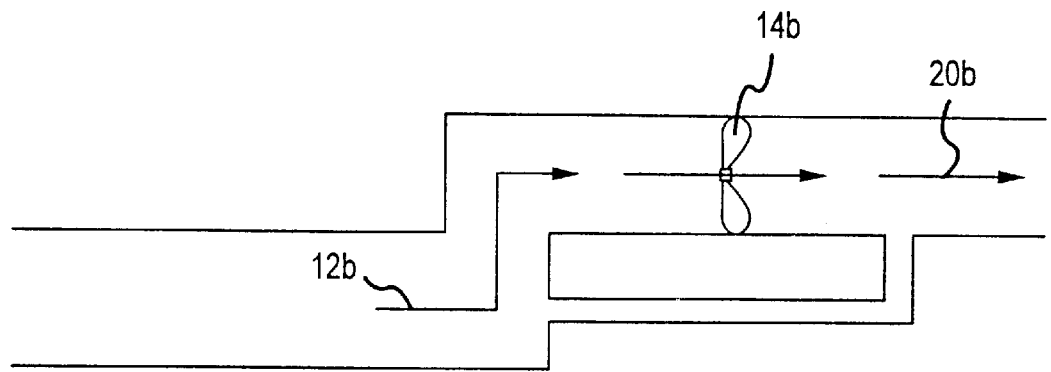

FIG. 19 shows a prior art ducted boundary layer opening.

Figure 20:
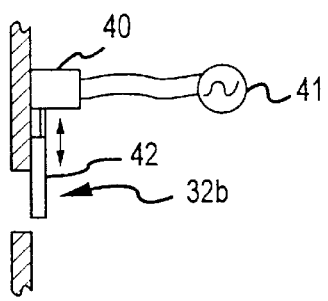

FIG. 20 shows an adjustable boundary layer opening.

Figure 21:
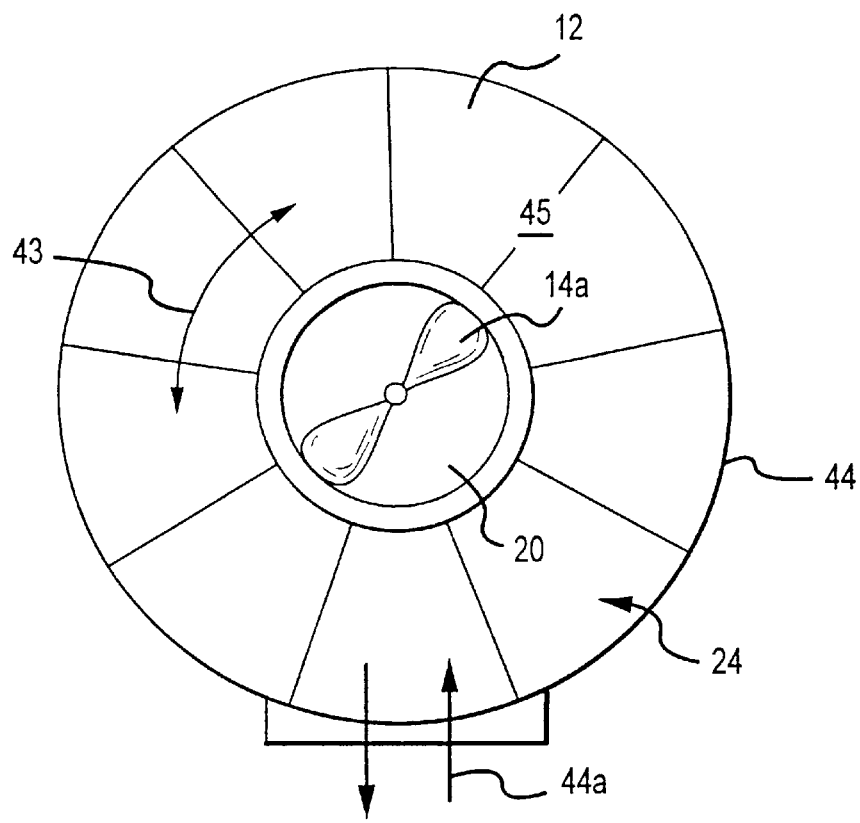

FIG. 21 shows one embodiment of a remote access and replacement filter changing element including a centralized location, a filter path, an annulus—arranged in a lazy Susan arrangement.

Figure 22:
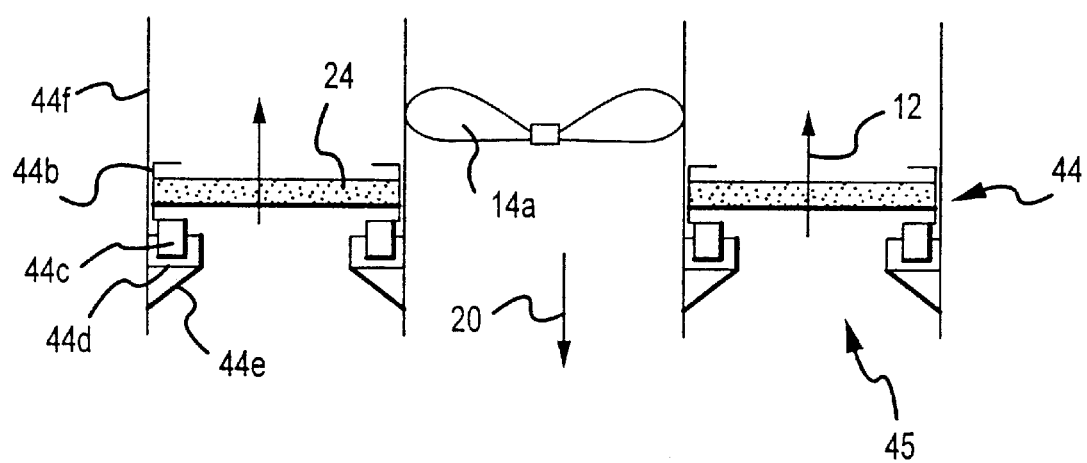

FIG. 22 shows one embodiment of a structure of a remote access and replacement filter changing element.

Figure 23:
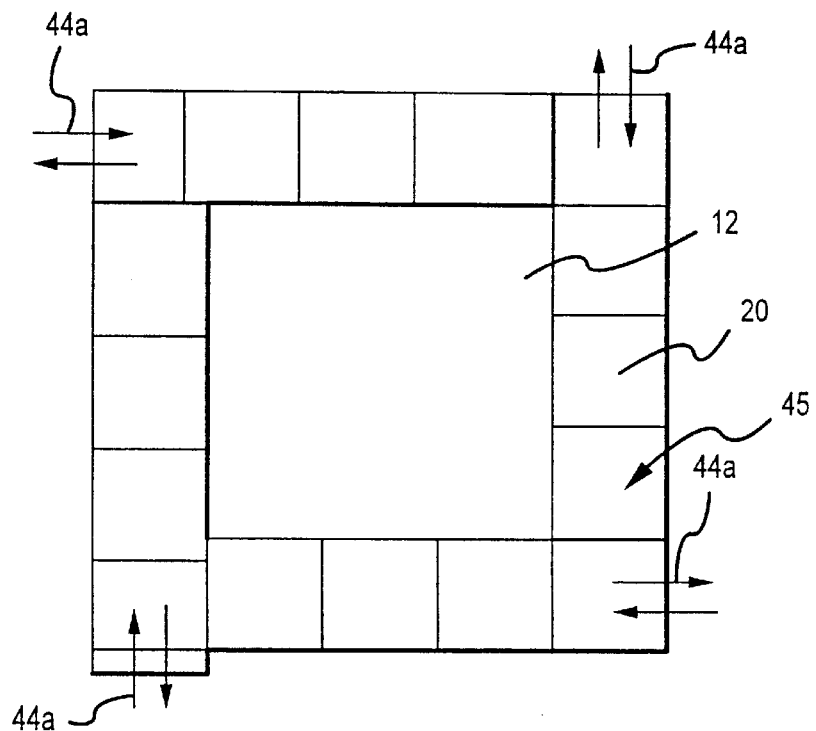

FIG. 23 shows an alternative embodiment of a remote access and replacement filter changing element in a more rectangular fashion, showing four rows and four centralized locations for remotely accessing and remotely replacing the filter elements.

Figure 24:
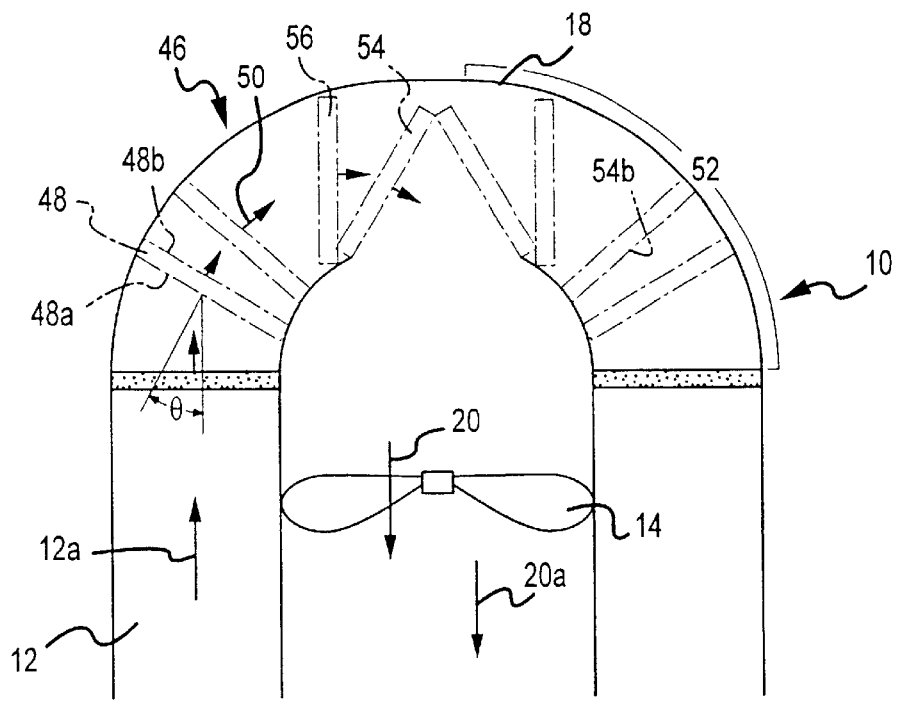

FIG. 24 shows a variety of positions of at least one conditioning element to assist in turning the direction of a flow of air.

Figure 25:
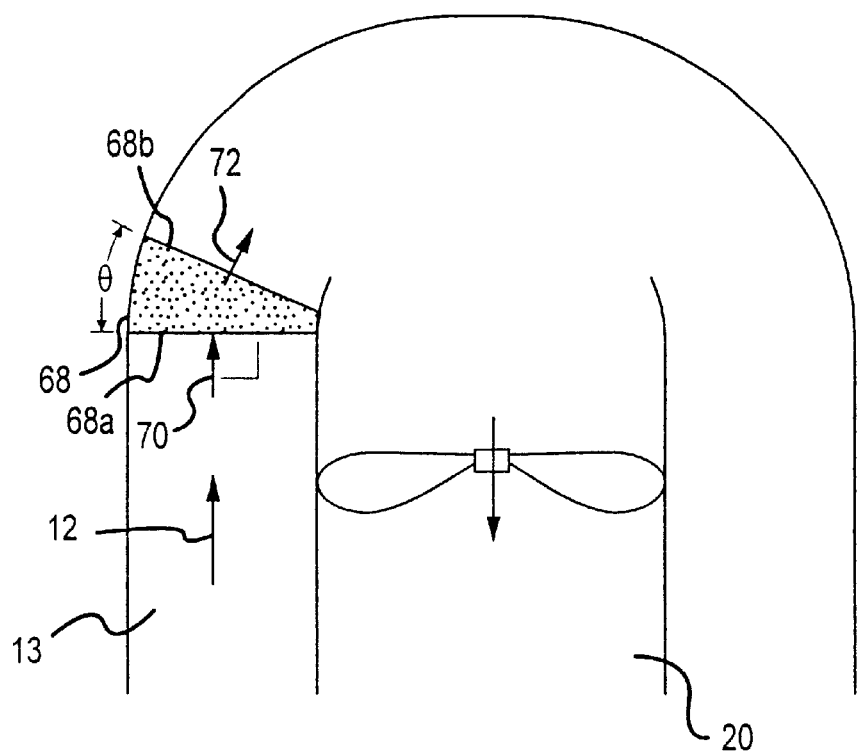

FIG. 25 shows a skewed flow face filter arranged as a filter in an air handling system.

Figure 25A:
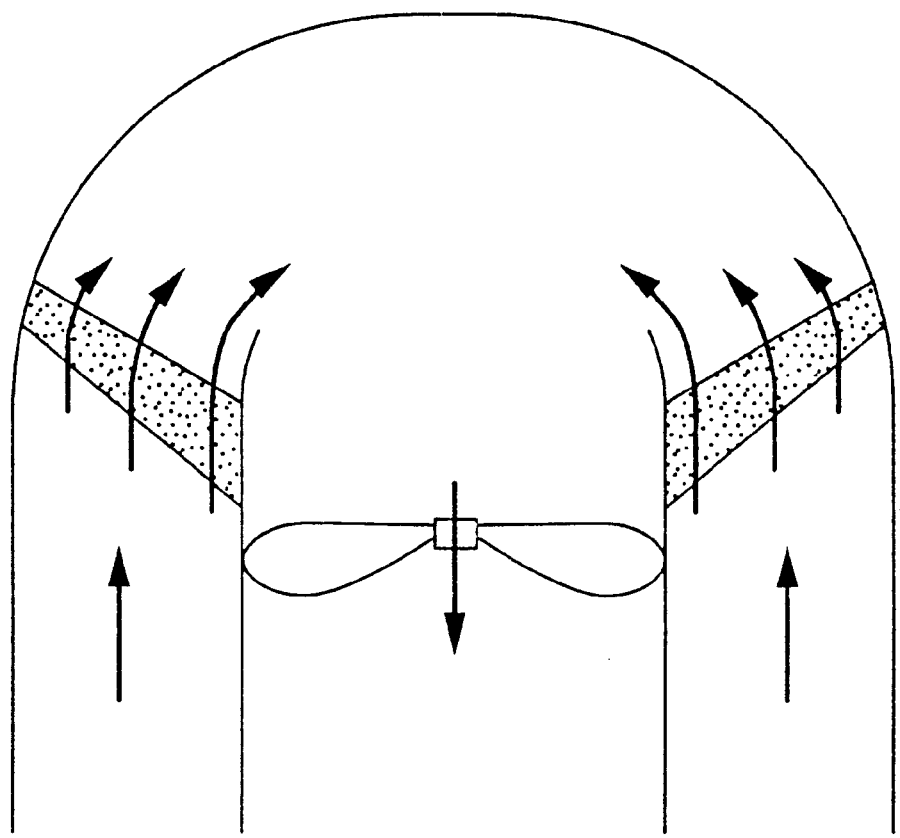

FIG. 25a shows an alternative arrangement of a varying flow resistance element, such as a skewed flow face filter in which both faces are inclined to the primary direction of the return flow path and the inner wall thickness is greater that the outer wall thickness.

Figure 26:
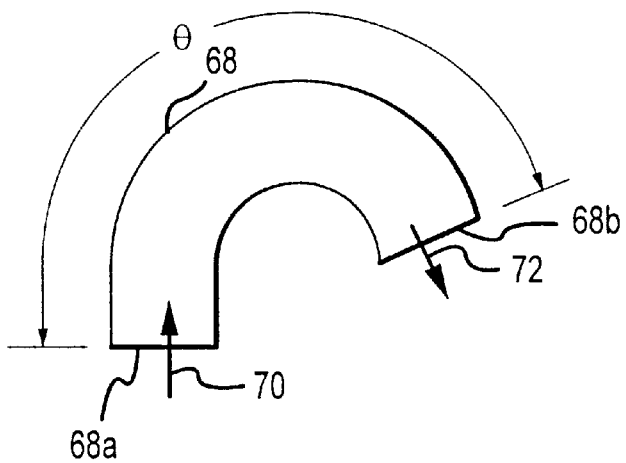

FIG. 26 shows an alternative embodiment of a skewed flow face filter at an obtuse angle.

Figure 27:
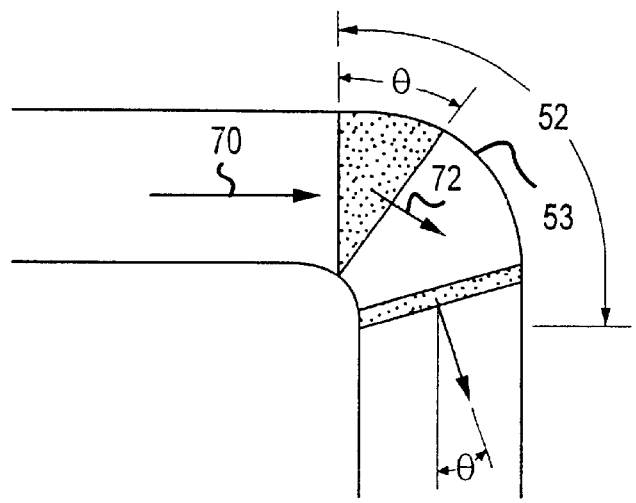

FIG. 27 shows the use of a skewed flow face filter and an inclined filter with a typical turning element, such as an ell in a conduit.

Figure 28:
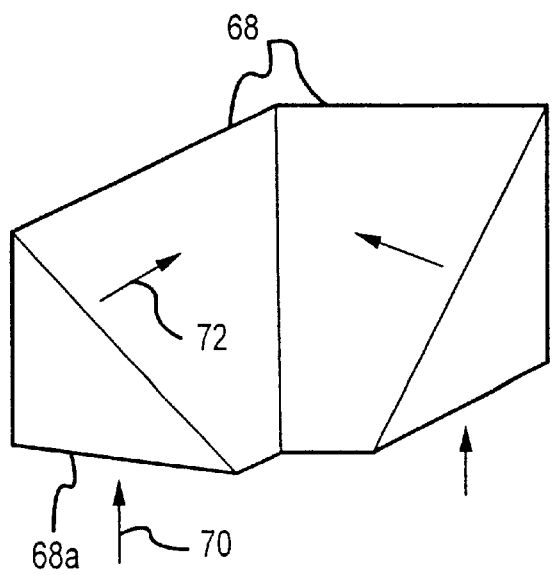

FIG. 28 shows a perspective view and use of a skewed flow face filter as part of a converging filter which may be placed in an annulus of an air handling system.

Figure 29:
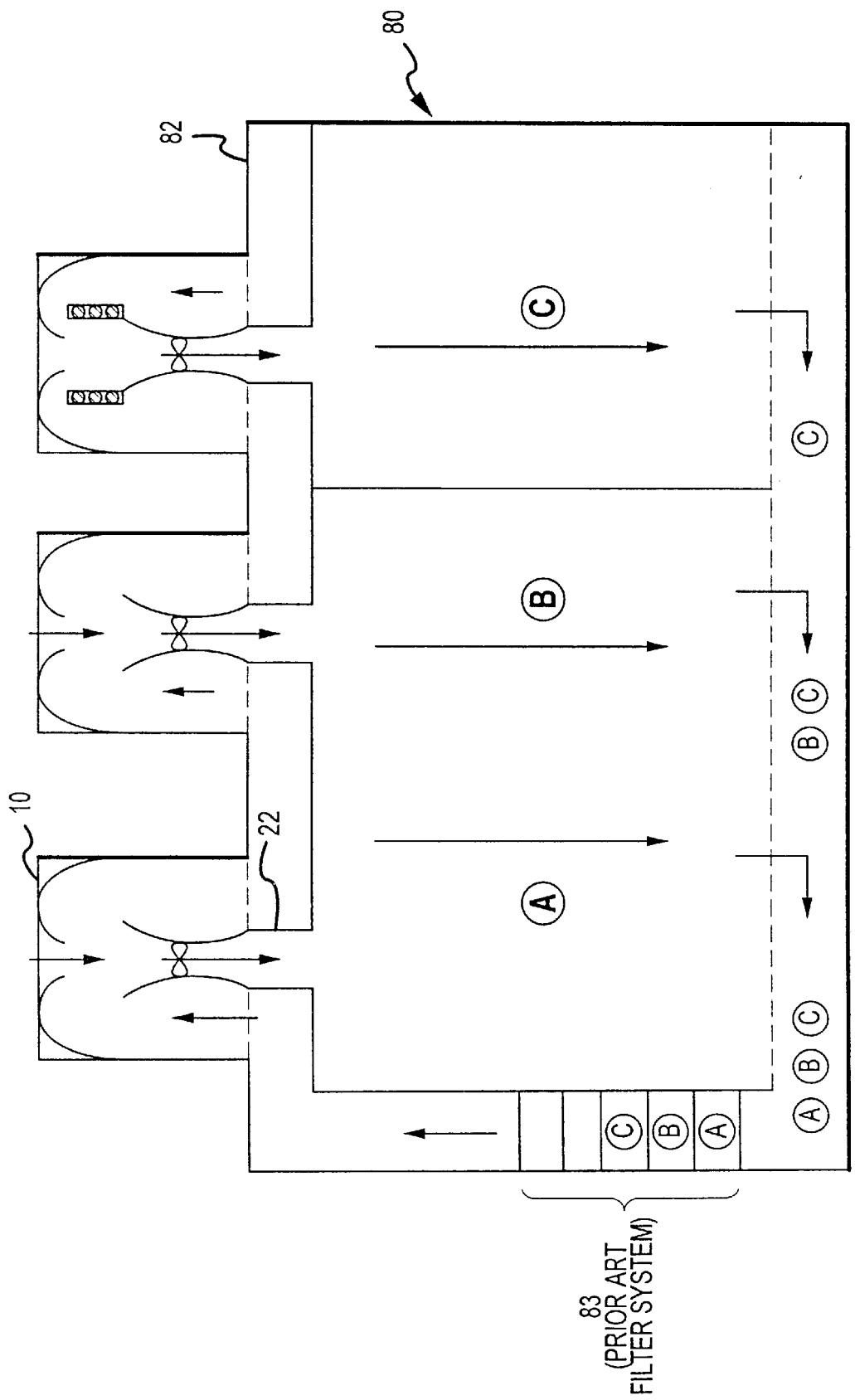

FIG. 29 shows the use of an air handling system such as described in the present invention in a clean room environment in which the return air is filtered through a bank of varying filter elements.

Figure 30:
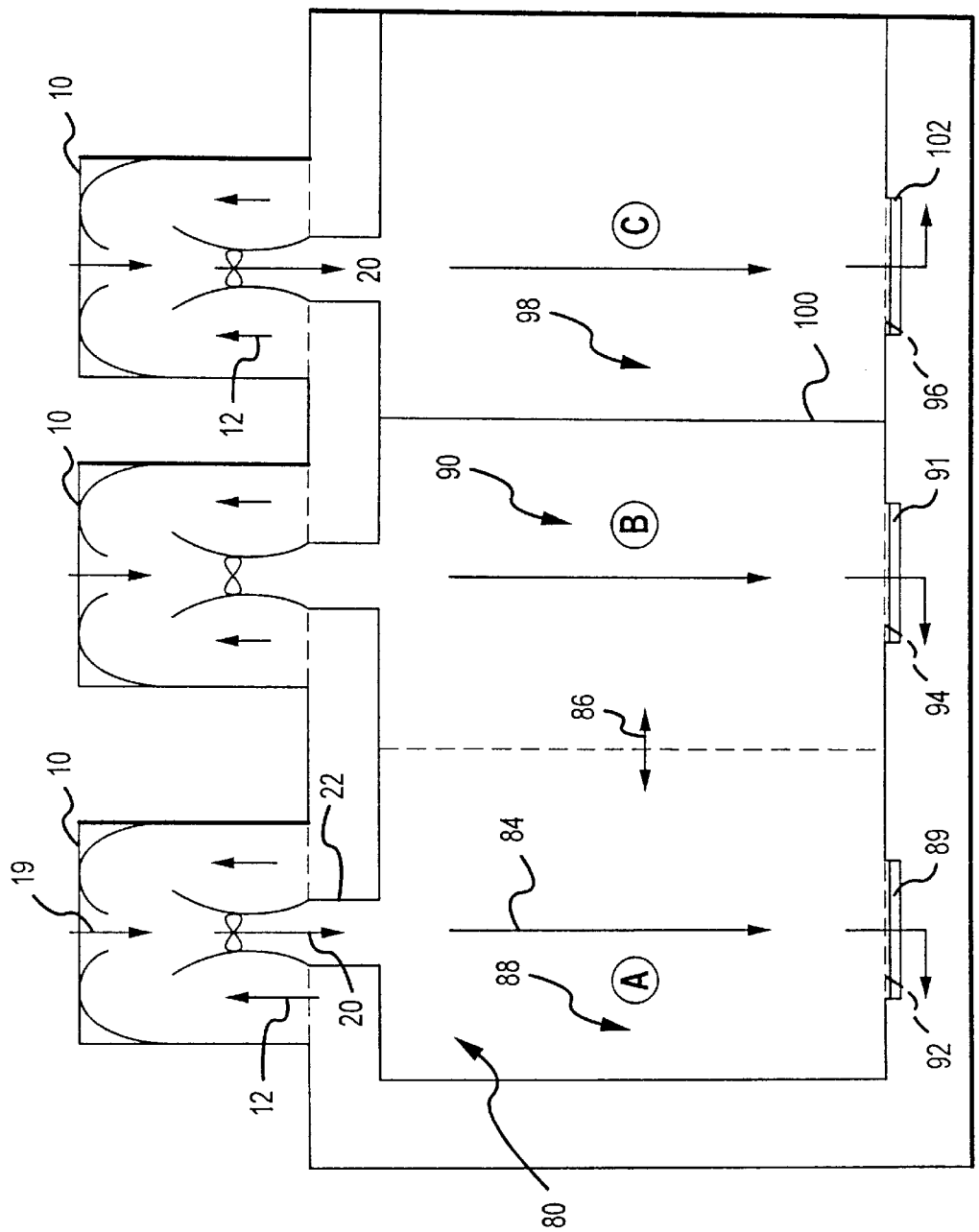

FIG. 30 shows a variation of a clean room environment in which zone and undivided zones are filtered with zone specific filters.

Figure 31:
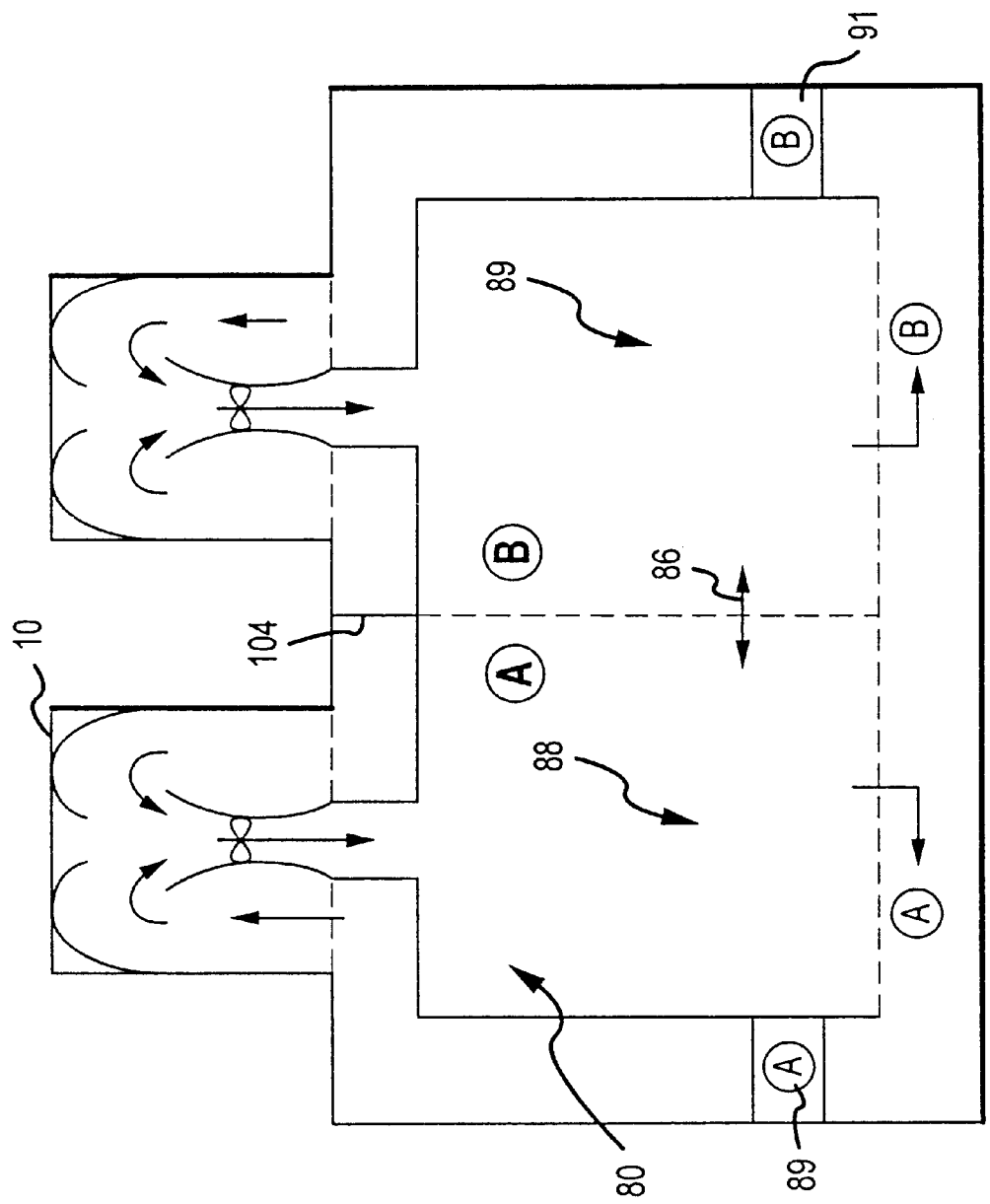

FIG. 31 shows a clean room atmosphere with zone specific filters with a zone specific return and supply flow path.

Figure 32:
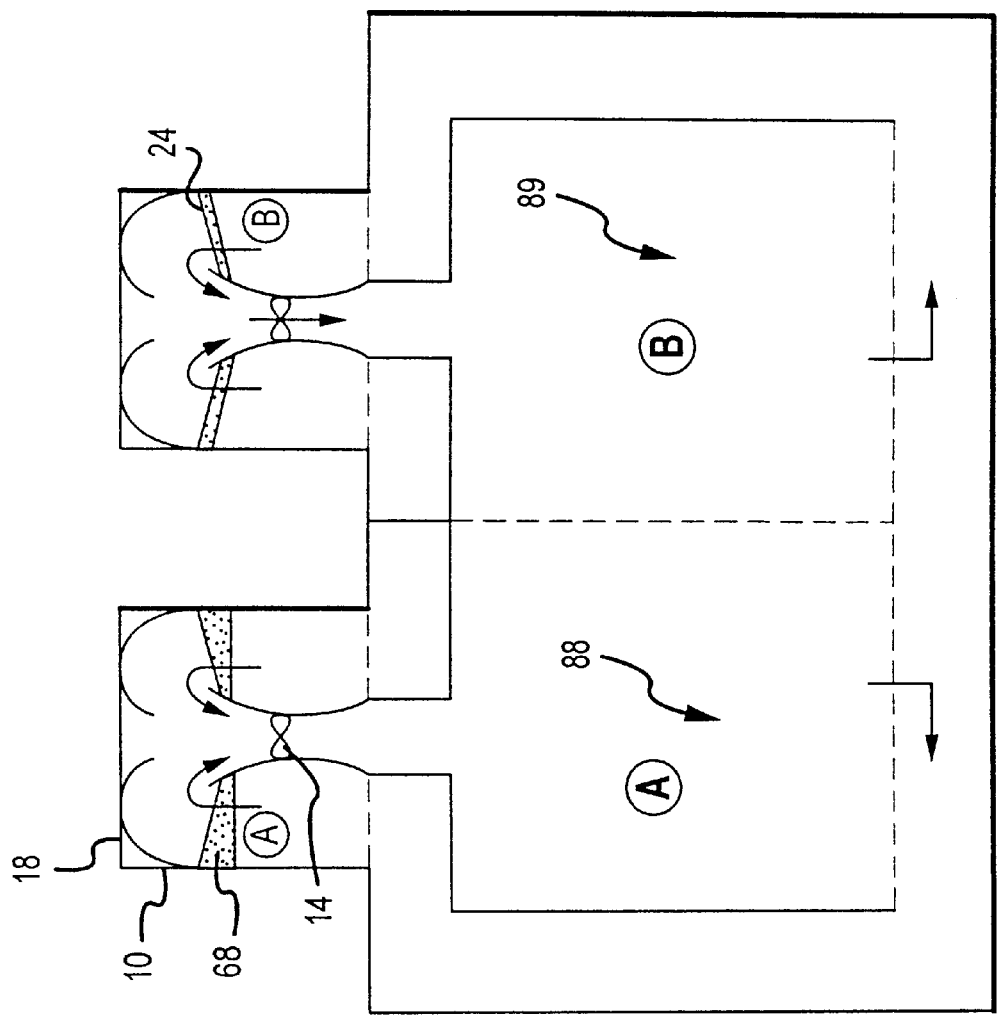

FIG. 32 shows a similar arrangement as FIG. 31 incorporating some of the features of the present invention such as a skewed flow face filter, an inclined filter, and a reversing element.

Figure 33:
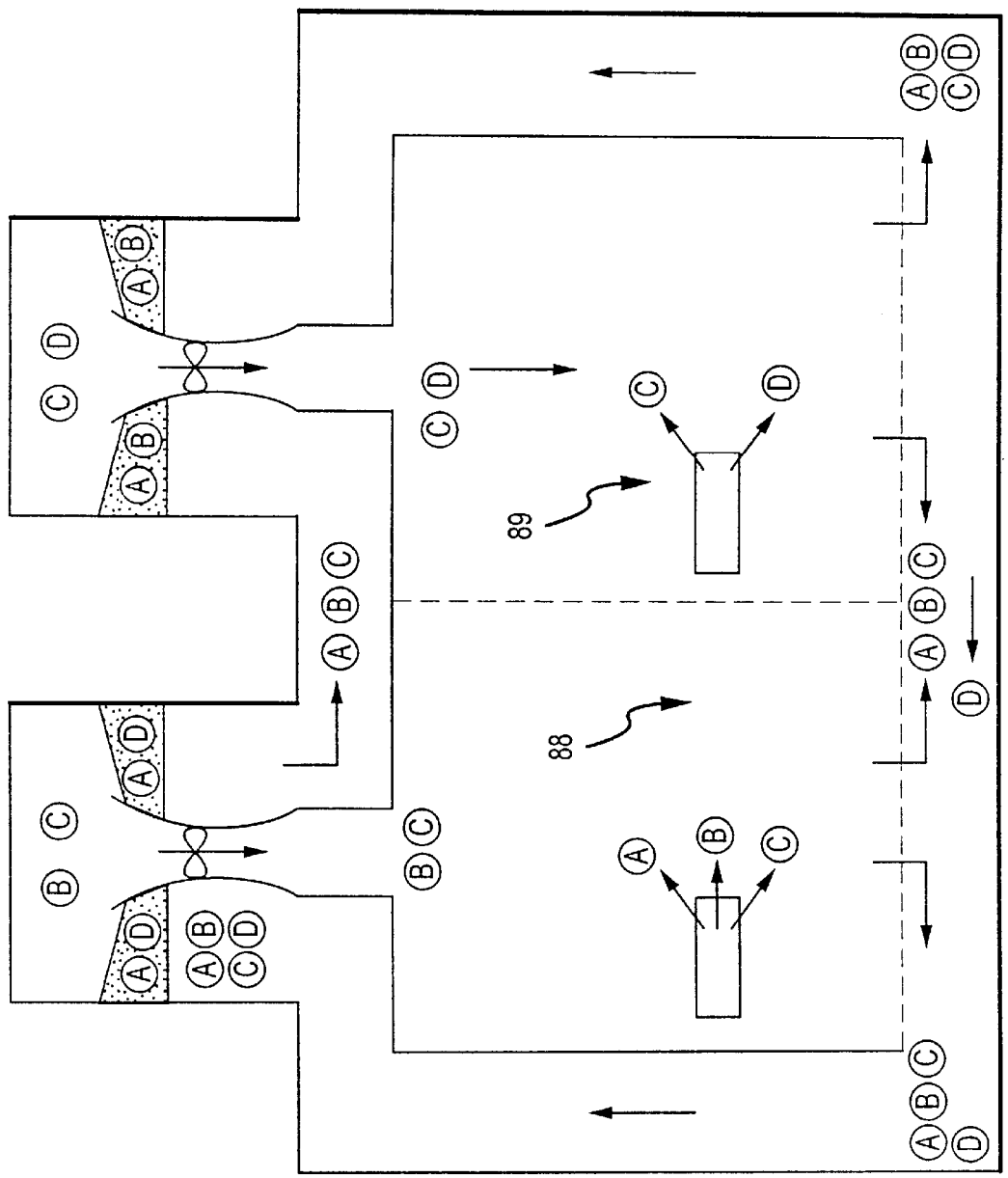

FIG. 33 shows an alternative arrangement of the air handling system used in a clean room with a zone specific supply flow path.

IV DETAILED DESCRIPTION OF THE PREFERRED EMBODIMENT

As can be easily understood, the basic concepts of the present invention may be embodied in a variety of ways. It involves both methods and devices to accomplish the appropriate method. In this patent, the methods are disclosed as part of the results shown to be achieved by the various devices described in various steps that are inherent to utilization. They are simply the natural result of utilizing the devices and systems as intended and described. In addition, while some devices are disclosed, it would be understood that these not only accomplish certain methods, but also can be varied in many ways. Importantly, as to the foregoing, all these facets should be understood to be accomplished by this disclosure.

As mentioned earlier, the present invention includes variety of components that may be used in different combinations, depending on the application that needs to be addressed. The invention is primarily designed to take advantage of improvements to air handling systems and may be combined and modified as needed for variety of shapes, sizes, orientations, as will be explained in more detail as the figures are described. This invention is intended to encompass a wide variety of uses for buildings, clean rooms, and appropriate devices. Elements, functions, and procedures that distinguish the present invention will be noted where appropriate.

The basic concepts of the present invention may be shown in a preferred embodiment which may include an air handling system which itself may include an annular external return flow path, a filtration element that may assist in turning the flow as the flow travels through a reversing element, a coil which may fluidicly surround an axial flow device to further assist in turning the flow into a supply flow path. The axial flow device may be an axial fan mounted in fluidic connection to the supply flow path. A duct from the supply flow path may provide air to the various places of the building to which it is directed. Also the preferred embodiment may include converging filters, skewed flow faced filters, boundary layer openings to favorably affect boundary layers toward an outer perimeter by using a pressure differential between adjacent flow paths, coils in particular locations to assist in providing uniform flow across the blades of an axial flow device, and a filter changing element described as a remote access and replacement filter changing element. Additionally, the present invention may be suited toward a clean room filtration system. The clean room may in particular include a clean room zoned in an undivided manner without physical obstructions and yet able to accomplish the goals of clean room filtration by zone specific filtration. Obviously, the herein described objects and goals are broader in scope than the preferred embodiment, and to the extent such goals and objects are broader, they are included this disclosure and in the claims.

Figure 1:
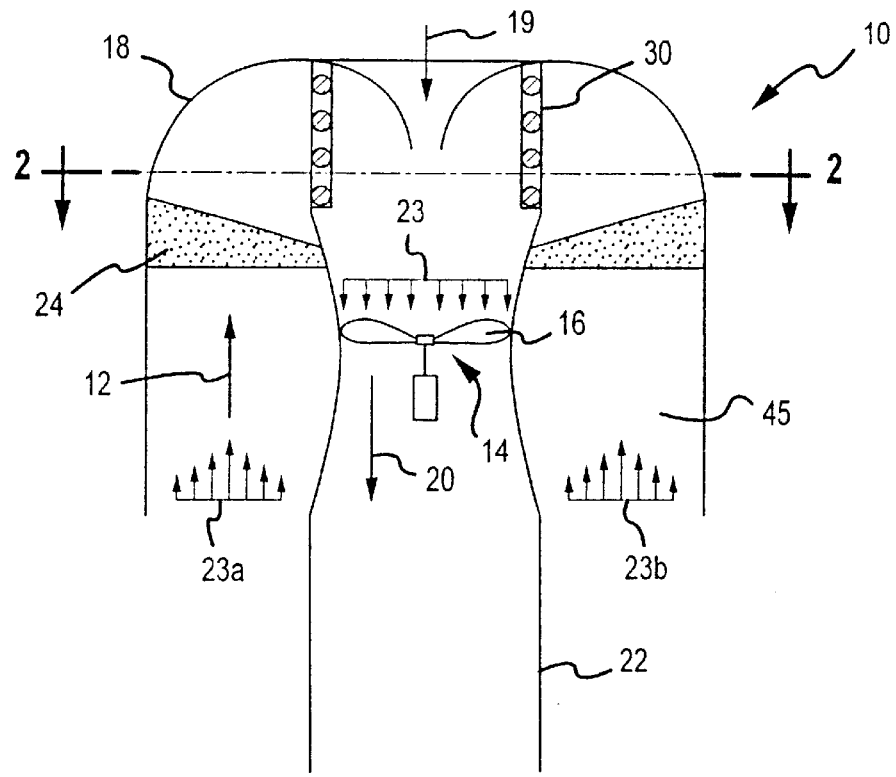
FIG. 1 shows a cross-sectional view of a preferred embodiment of the present invention showing a return flow path, a supply flow path, an axial flow device, a filter, a reversing element, and a coil for an air handling system.

In FIG. 1, a cross-sectional view of a preferred embodiment is shown. An air handling system (10) is generally shown. The air handling system generally includes a return flow path (12). The return flow path as shown may be an annular return flow path, The annular return flow path may surround the supply flow path (20). Additional flow paths may include, for instance, makeup air. Makeup air as would be known to those skilled in the art may be useful for providing fresh ventilation as well as additional ventilation. The air traveling along a primary flow direction of the return flow path (12) shown as an arrow in FIG. 1 in the preferred embodiment first enters a filter (24). The filter may be fluidicly connected to an axial flow device. After the filter, the air may enter a zone defined by a reversing element (18). The reversing element may assist in reversing the flow through the return flow path into the supply flow path. The reversing element may include flow directional devices, diverters, and so forth, as would be known to one skilled in the art. An axial flow device (14) is fluidicly connected to the reversing element (18). The axial flow device accelerates the flow of the air in the return flow path and supplies air through the supply flow path (20) to such typical elements as a duct (22). Obviously, other variations are possible. Located in a preferred embodiment upstream of the axial flow device (14), may be a coil (30). The coil (30) may be positioned to fluidicly surround the axial flow device (14). The term, "fluidicly surround," is meant to include the concept that substantially most of the air flows through the device or element without substantial leakage around the device. The axial flow device (14) may have adjustable pitch blades (16). The adjustable pitch blades may assist in changing air flows, pressures, and efficiencies.

In the preferred embodiment, the supply flow path is surrounded by the return flow path. Other variations are possible. For instance, the supply flow path could surround the return flow path in some situations. Therefore, for the purposes of the present invention, it may generally be stated that one of either of the supply flow path or return flow path is surrounded by the other flow path for at least of a portion of the flow paths.

By surrounding the flow paths, certain efficiencies occur. For instance, generally less weight in the overall air handling unit (10) may occur. Because of the flow structure, a more uniform flow distribution (23) may also occur. As described above, one of the difficulties in using an axial flow device has been pressure and flow gradients across the cross-sectional area of a blade shown as flow gradients (23a) and (23b) in FIG. 1. With the present invention, a more uniform flow appears to occur such as shown as uniform flow distribution (23) in FIG. 1. Thus, fan and blade life may be extended. Other features of the present invention also are enhanced by one flow path being at least partially surrounded by the other flow path. For instance, as will be described in more detail below, a simplified boundary layer adjustment may be had.

Figure 2:
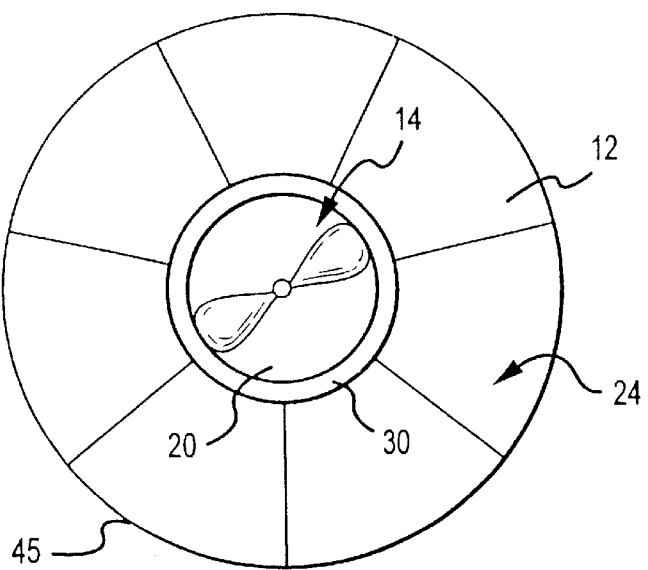
FIG. 2 shows a cross-sectional view of FIG. 1, viewed from the top, showing a return flow path, a supply flow path, an annulus containing a plurality of converging filters, and an axial flow device.

FIG. 2 shows a top view of FIG. 1 in that an annulus (45) may be formed by the relative position of the return flow path with respect to the supply flow path or vice versa. While an annulus may be considered a ring or a structure or marking resembling a ring, it is not so restricted in the present application. Basically, it can be a space of any shape formed by a relative location of the return flow path and the supply flow path. For instance, one embodiment could be more of a rectangular annulus shown in FIG. 23. As mentioned earlier, in some instances the supply flow path may surround the flow path; in other instances, the return flow path may surround the supply flow path. As shown in FIG. 2, the annulus may be useful for placing a plurality of filters (24) through which the air flows. The placement of the filter in the return air is typically preferred because of the lower flow velocities. For instance, the typical velocity flow through a return flow path may be 500 FPM, whereas the supply flow path from an axial flow device may be typically be 3,000 FPM. The filter elements may not be constructed to withstand such high flow rates from the supply side. Also shown in FIG. 2 is a top view of a coil (30) which fluidicly surrounds the axial flow device (14). Typically, in the preferred embodiment, the top and bottom of the coil would be sealed to minimize air leakage. This would encourage most if not all of the air flowing to the axial flow device to flow through the coil. The inventors have discovered that by selectively positioning the filter and coil, certain enhancements may be made in turning the air in the return flow path into the supply flow path. FIG. 2 also shows an arrangement of the supply flow path (20) in a coaxial relationship with a return flow path (12). By "coaxial," it is meant that the approximate center of one flow path is aligned with the approximate center of the other flow path. Naturally, other embodiments may not use such alignment. The present invention seeks to encompass the general principal of surrounding one flow path within the other flow path and utilizing a reversing element in the process. These will be described in detail below. For purposes of present invention, unless specifically stated otherwise, "surrounded" is meant to include at least partially surrounded.

Figure 3:
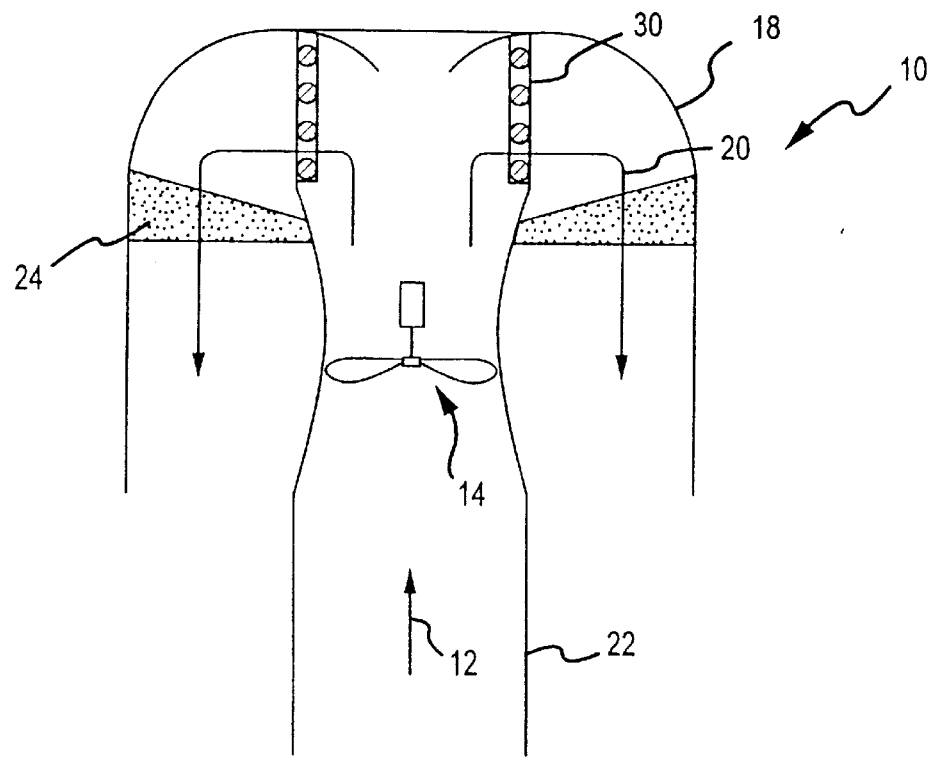
FIG. 3 shows an alternate of the preferred embodiment of FIG. 1, in which the supply flow path at least partially surrounds the return flow path with an axial flow device located in the return flow path.

FIG. 3 shows an alternative embodiment which the supply flow path (20) surrounds the return flow path. The return flow path in FIG. 3 is fluidicly connected to the axial flow device (14) which then forces the air upward and through the fluidicly surrounding perpendicularly aligned coil (30) into the reversing element (18). The air is turned and flows through the filter element (24) in the supply path and then on to its destination. In this embodiment, the relative square area of the supply flow path (20) compared to the return flow path (12) might be sized to reduce the flow to a flow rate suitable for filtering in the supply flow path.

Figure 4:
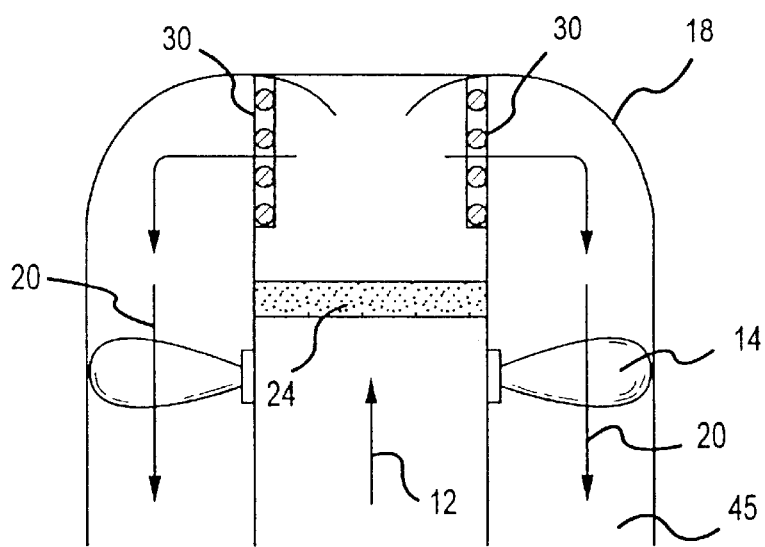
FIG. 4 shows another embodiment of the present invention in which the supply flow path at least partially surrounds the return flow path and the axial flow device is located in the supply flow path.

FIG. 4 shows yet another embodiment in which the supply flow path (20) surrounds the return flow path (12). The embodiment in FIG. 4 (and FIG. 3) shows a substantially "enclosed" return flow path. By substantially "enclosed," it is meant here and throughout the patent that most if not all of a cross section of the flow path in question is included within a cross section of the other flow path, that is, closed in by the other flow path. Unless specifically stated otherwise, "enclosed" includes "substantially enclosed" as would be expected by one skilled the art. For purposes of the present invention, this is differentiated from "surrounding" where "surrounding" is not restricted to totally enclosed. "Surrounding" in this patent invention includes the idea that a portion of one flow path is bounded by or between at least two discrete areas of the other flow path and could include the configuration where one flow path is adjacent the other flow path and separated by an interface. It specifically is not limited to encircled or enclosed. The axial flow device (14) has an annular blade path to flow the air through the annulus (45). The air may travel through the filter (24) into the reversing element (18). This may include flowing through the coil (30) which maybe positioned at a perpendicular angle to, at least in this embodiment, both the primary direction of the return flow path (12) and the primary direction of the supply flow path (20). Such an axial flow device could, for example, have an open center to allow a cross section of the return now path to be positioned inside a cross section of the supply flow path.

Figure 5:
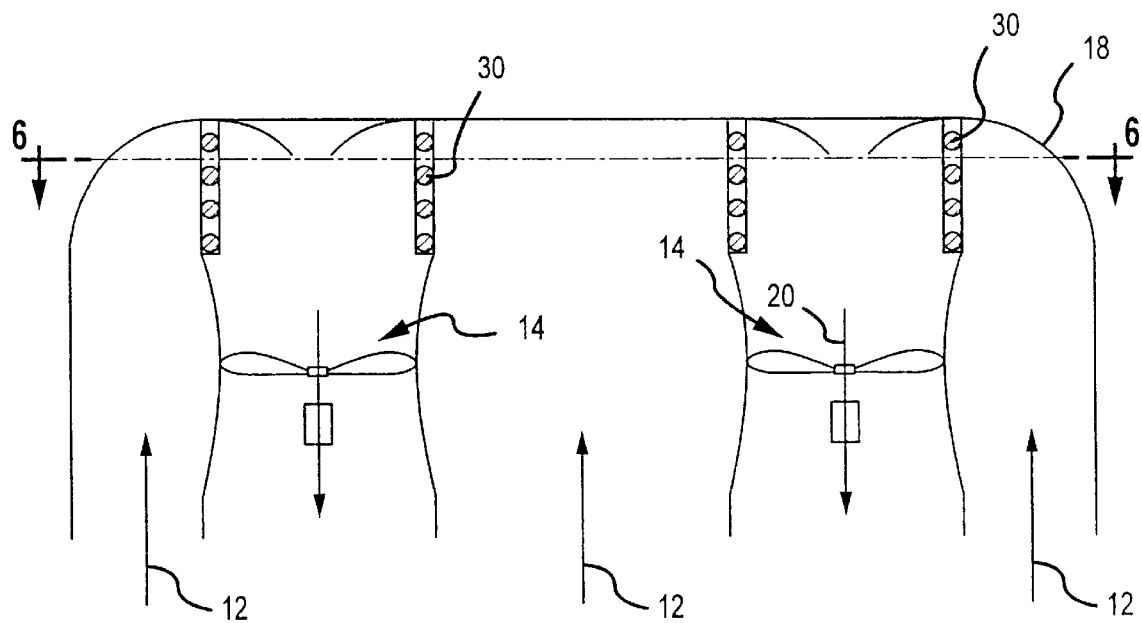
FIG. 5 shows another variation of the invention in which at least a pair of supply flow paths, axial flow devices, and coils may be at least partially surrounded by a return flow path.

FIG. 5 shows yet another embodiment as a side view. In this embodiment, two supply flow paths (20) with two axial flow devices (14) and two coils (30) are surrounded or even enclosed by the return flow path (12). Obviously, a plurality of supply flow paths could be surrounded by one or more return flow paths and vice versa. The coils might be positioned substantially perpendicular to the primary flow direction of the return flow path in the air handling system and could be also perpendicular to at least a portion of the primary flow direction of the supply flow path where the supply flow path is aligned parallel to the return flow path.

Figure 6:
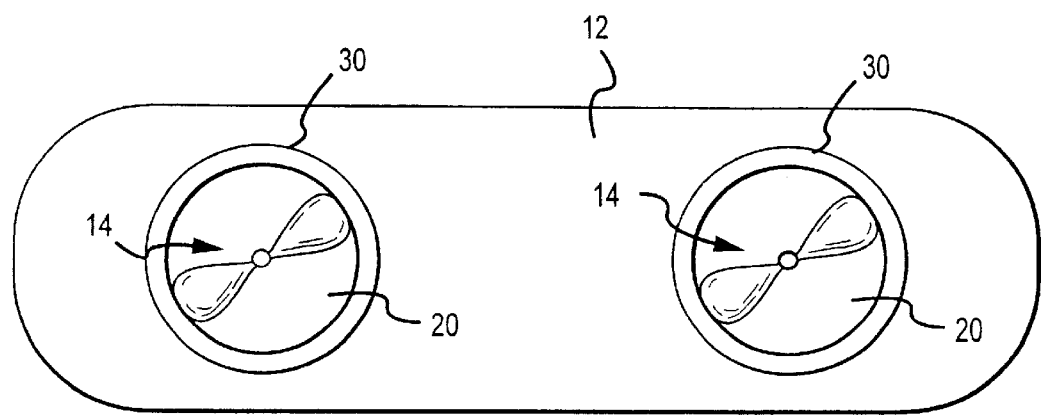
FIG. 6 shows a top view of a cross-section of FIG. 5.

FIG. 6 shows a top view of FIG. 5 in which the above-described goals and objects of the present invention still apply.

Figure 7:
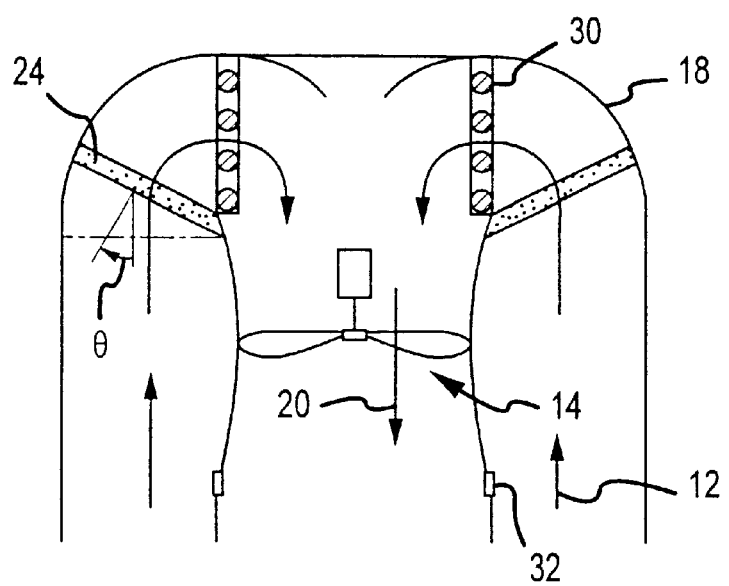
FIG. 7 shows a variation of FIG. 1 in which the filter (24) may be inclined at an angle to a primary flow direction of at least one of the flow paths.

FIG. 7 shows yet another embodiment of the present invention which may be similar to FIG. 1. However, in this embodiment, the filter (24) is inclined at an angle, θ, to the primary flow direction of the return flow path (12). In this embodiment, it is also inclined at an angle to the primary flow direction of the supply flow path. Such an inclination of the filter (24) may assist in turning the flow of the air from the return flow path into the supply flow path. It is believed that the orientation of the filter may assist in reducing the pressure losses that otherwise could occur from strictly relying on external elements such as deflectors, piping, Tees, or elbows. It is believed that since a filter is generally used as part of a system, there is no additional pressure loss (such as could occur by strictly relying only on such typical external elements) by inclining it at an angle. By inclining it at an angle, it is believed that flow of air at the surface of the filter tends to exit perpendicular to the surface. Therefore, as the air exits the filter face, it appears already oriented toward the direction in which the flow is desired to turn i.e., a turned direction. Thus, turning may be accomplished with less pressure drop than might otherwise occur. A further advantage is that by using the filter and perhaps the coil ahead of the axial flow device, a more uniform flow distribution may occur across the surface of the axial flow device's blades. The term "uniform flow" is intended to mean a substantially balanced flow, that is, a very small radial or circumferential variation flow. Similarly, the filter is fluidicly connected to the axial flow device in that the fluid, such as air, flows from one element to the other and, in this embodiment, from the filter to the axial flow device.

Figure 8:
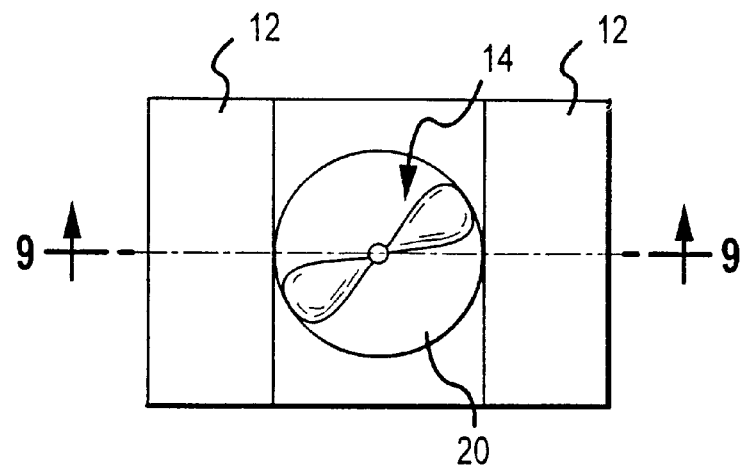
FIG. 8 shows another embodiment of the present invention in which at least a pair of returns forming a return flow path at least partially surround a supply flow path which may contain an axial flow device.

FIG. 8 shows yet another embodiment of the present invention in which the supply flow path (20) is bounded on at least two sides by a pair of return flow paths (12). The goals and object of the present invention may be encompassed in this embodiment and it is intended that "surround" include this embodiment. Also as shown in FIG. 8, the invention may include symmetrical flow paths about the other flow path. It is believed by having symmetrical returns through which the return flow paths occur one goal of substantial uniformity to the axial flow device (14) may be enhanced.

Figure 8A:
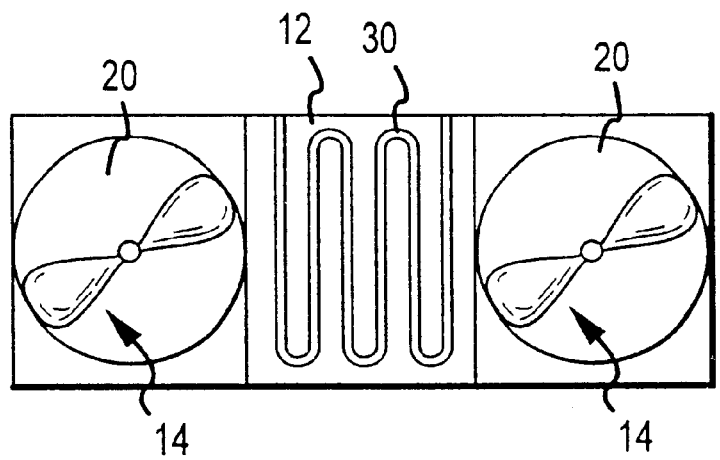
FIG. 8a shows an alternative to FIG. 8 in which a pair of supply flow paths (20) at least partially surround a return flow path (12) which may include a coil (30).

FIG. 8a shows yet another embodiment of the present invention in which the return flow path (12) is bounded on at least two sides by a pair of supply flow paths (20). This embodiment is an alternative to the embodiment shown in FIG. 8. In this embodiment, a single return could supply air to the pair of supply flow paths. A coil, which could include a substantially flat coil, known to those in the art, could be inserted in the return flow path (12). Similarly, to FIG. 9, a reversing element (18) could be located such that the flow from the return path (12) could be affirmatively reversed into one or both of the supply flow paths (20). A filter could be placed in an appropriate location if desired.

Figure 9:
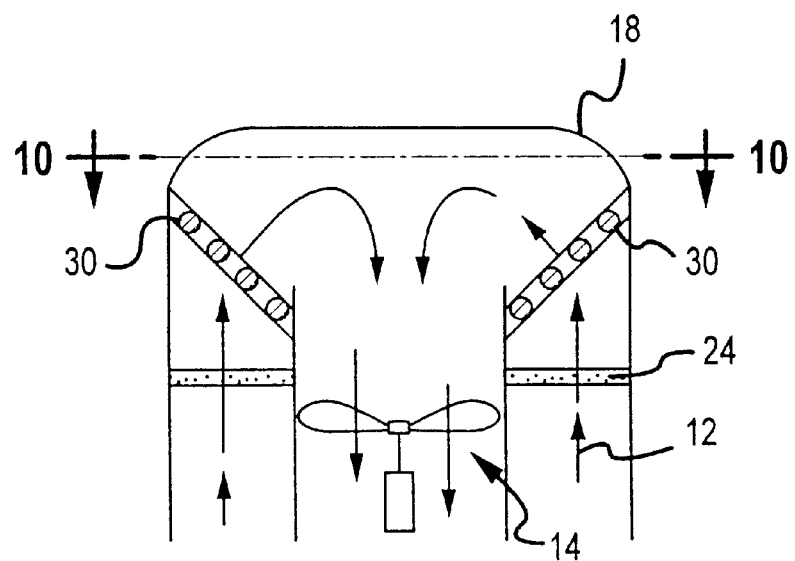
FIG. 9 shows a cross-section of FIG. 8 in which the pair of returns with a return flow path flow may be fluidicly connected to a filter, an inclined coil a reversing element, and into a supply flow path, and an axial flow device.

FIG. 9 shows a side view of FIG. 8. FIG. 9 may offer an advantage of using a coil, including a flat coil typically found in the industry, to flow the return air because the return flow paths are rectangular. Similarly, filters (24) could use a standard rectangular or other quadrilateral shaped filter. The flow through the return flow path (12) similar to the other embodiments could first enter the filter (24), then flow through the coil (30) which may be inclined at an angle and offer a benefit similar to the inclined filter of FIG. 7. The flow may then enter the reversing element (18) and reverse into the axial flow device (14) and into the supply flow path (20).

Figure 10:
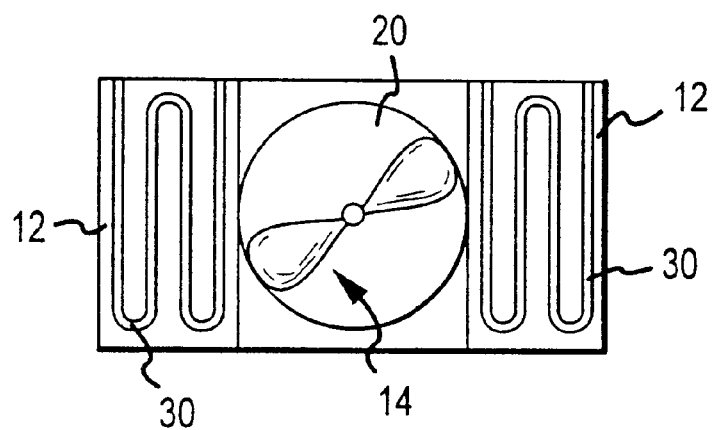
FIG. 10 shows a cross-section of FIG. 9 from a top view in which a pair of coils may be located in the return flow path before the air enters a supply flow path.

FIG. 10 shows a top view of FIG. 9 in which the coil (30) may be a typical rectangular shaped coil through which the return air from a return flow path (12) flows before entering the supply flow path (20). This may offer an aspect of using industry standard flat coils to accomplish the goals and objects of the present invention.

Figure 11:
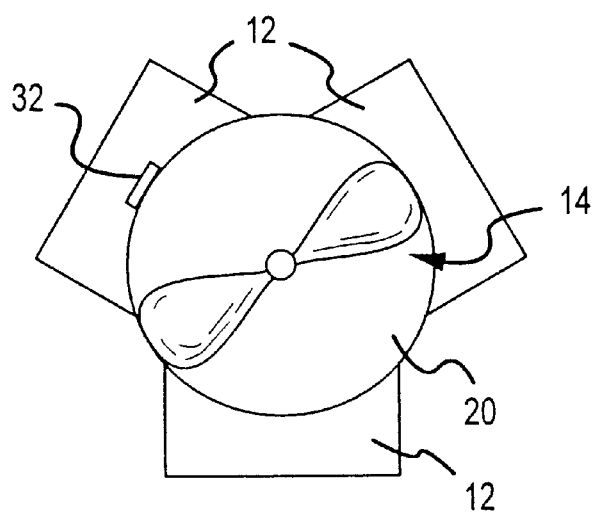
FIG. 11 shows yet another embodiment of the present invention in which a plurality of returns at least partially surround the supply flow path and in which at least a portion of the supply flow path is aligned with the return flow path in a multiaxial manner.

FIG. 11 shows yet another embodiment in which three returns each having a return flow path (12) surround the supply flow path (20) and into which the air from the return flow paths enter the axial flow device (14). This multiaxial (here triaxial) arrangement is believed to still allow a substantially uniform flow across the axial flow device (14). By "multiaxial," it is meant that there are a plurality of returns aligned along an axis, such as the supply flow axis. This may be enhanced by the selective placement of coils and filters such as is described herein. Also, FIG. 11 shows at least one boundary layer affecting element (32). A boundary layer affecting element (32) affects the location of a boundary layer, described further in FIG. 17 below. Furthermore, the multiaxial returns through which the return flow paths (12) occur may be symmetrical about the supply flow path (20).

Figure 12:
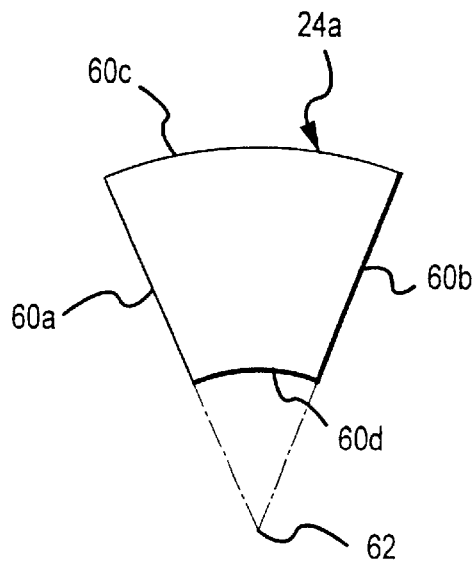
FIG. 12 shows a top view of a converging filter, having at least two converging sides.

As has been described above, the present invention may include a filter as part of the system. Generally, filters tend to be located upstream of an axial flow device, a fan, or some other air moving element. This tends to reduce the amount of contaminants and particulates deposited on the flow device that may extend the life. However, in some circumstances, the filters and even the coils may be located downstream of the flow device. The goals and objects of the present invention include both locations and others as may be appropriate. FIG. 12 shows a particular filter which may be appropriate for the preferred embodiment, that is, a converging filter (24a). By "converging" it is meant to include that at least two sides, here first side (60a) and second side (60b), converge toward an intersection (62). The intersection (62) may be on the filter itself or may be at a distant point. This shape allows a filter to be readily situated about an annulus (45), as shown is FIG. 1 and FIG. 7 for instance. First side (60a) and second side (60b) are separated by at least one other side, here third side (60c). Naturally, it could include a fourth side (60d) as shown and a preferred embodiment could include such a side to fit around the annulus (45).

Figure 13:
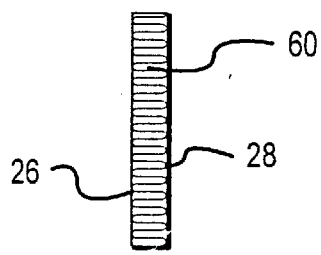
FIG. 13 shows a side view of FIG. 12.

FIG. 13 shows a side view of FIG. 12. It includes two flow faces nominated first flow face (26) and second flow face (28). The relevance of the flow faces are described elsewhere in more detail. In general, the faces can be angled to a direction of a primary flow or inclined. The flow faces may also be angled or skewed with respect to each other.

Figure 14:
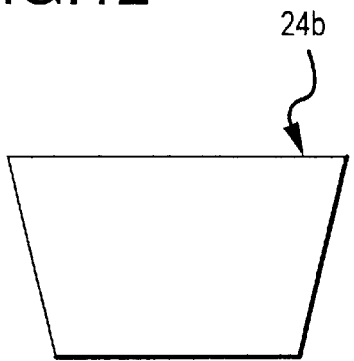
FIG. 14 shows an alternate variation of a converging filter, shaped as a trapezoid.

Another embodiment of the converging filter is shown in FIG. 14. The converging filter (24a) may take a shape of a trapezoidal filter (24b). Trapezoidal filter may be commercially easier to manufacture compared to the embodiment shown in FIG. 12 and still may perform well in conjunction with an annulus shown in FIGS. 1, 2, and 7, for instance.

Figure 15:
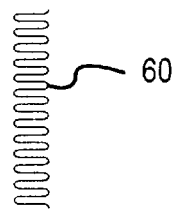
FIG. 15 shows a side view of a possible embodiment of FIG. 14 where the filter element media does not require a frame.

FIG. 15 shows a side view of one embodiment of FIG. 14. In this embodiment, there is not shown a frame. The filter element media (60) may be sufficiently rigid or otherwise self-supporting to not require a frame. Naturally, a frame could be provided.

FIG. 16 shows such a frame (64). Frame (64) would typically encompass at least two sides of the filter element media (60). A restraining device (65) may restrain the filter element media (60) to the frame (64). For instance, a restraining element could be glue, snaps, rivets, or other appropriate restraining elements as would be known to those in the art. Such a filter could be used in the present invention and as a system might include a return flow path, converging filters, a fan fluidicly connected to the return flow path, and a supply flow path, as described herein with the goals and objects of the present invention and other portions of the patent. The fan might even be a different variety of fan besides an axial flow device. The converging filter could generally be described as a polysided configuration having at least three sides with two sides converging and a third side separating the two sides, and in the preferred embodiment having four sides.

Naturally, the converging filters could surround the fan and could even be substantially fluidicly surrounding the fan. This again may assist in a more uniform flow to the fan. Also, the converging filter could be inclined to the primary flow direction of a flow path such as the return flow path. This may be seen, for instance, in the embodiment of FIG. 7.

In manufacturing such a filter element, it could generally be described as utilizing a section of a filter element media forming a polysided, three dimensional configuration of the media, including forming at least two converging sides and at least one other side to separate the two converging sides. Also, it could include forming a polysided, three dimensional frame to fit the filter element media, including forming at least two converging sides and at least one other side to separate the two converging sides from frame material, and restraining the media in the frame to form a framed converging filter.

FIG. 17 also discusses the issue of the boundary layer. Part of the present invention may include a boundary layer affecting element (32). The boundary layer affecting element (32) may affect the location of the boundary layer (34). Generally, it may be preferred to move the boundary layer (34) to the outer periphery of the flow path, here supply flow path (20). Part of the rationale is that as the flow moves toward the outer periphery, there is a larger perimeter (36) for the flow to occur. The term "perimeter" is intended to mean more than simply a circular boundary and can be a boundary of a closed figure of any shape. This may assist in reducing the flow velocity for a given flow volume. For instance, if the flow was pushed toward the middle, the velocity might increase with undesirable affects such as noise, vibration, and other situations. Splitters (34a) are typically used as a boundary layer affecting element. However, the splitters are generally fixed in location and fixed in angular orientation and fixed in flow characteristics. Thus, in designing a system, the use of splitters, while desirable, may be complex. The present invention, with the use of the axial flow device, is believed to better use the splitter (34*a*). It may be that, because of the more uniform flow distribution shown in FIG. 1 and FIG. 17, a more uniform division across the splitter may be had. Furthermore, the use of multiple splitters as shown in FIG. 17, may also be enhanced by the uniform flow distribution (23).

However, in a preferred embodiment, the boundary layer affecting element may be a boundary layer opening (32*b*) shown in FIG. 18. The boundary layer opening (32*b*) appears to be particularly suited to the present invention. In general, as would be known to those in the art, the principle of using a boundary layer opening is that the higher pressure of the supply flow path (20) is affected by an opening to the lower pressure in the return flow path (12). The embodiment shown in FIG. 18 has a supply flow path (20) at least partially surrounded by the return flow path (12). As described above, obviously this arrangement could be reversed or other embodiments utilized. Thus, the boundary layer affecting element would be fluidically connected to at least one of the flow paths. In a preferred embodiment, it could be fluidically connected to both flow paths by using the boundary layer opening. If the return flow path and supply flow path are separated by an interface (38), then the boundary layer opening could naturally be located at this interface. While it is envisioned that a plurality of such openings would generally be used around the perimeter (36) at some axial location as shown, it is possible that selective use of even one boundary layer opening could have some advantageous effects. For instance, a boundary layer opening could divert or direct the flow in the supply flow path through a particular location. Generally, however, it is envisioned that there will be at least a plurality of such openings spaced around the perimeter of the interface. Naturally, variations of this could occur. For instance, a circumferential slot or a continuous circumferential slot could achieve the same purpose.

The boundary layer opening may be especially useful for this particular invention. Before the present invention, such boundary layer openings were ducted because the return flow paths (12*b*) and supply flow paths (20*b*) were not adjacent or otherwise surrounded by the other flow path. An example, for instance, may be seen in FIG. 19, wherein the high pressure from the downstream flow from the fan (14*b*) may have been affected by the open path to the return flow path of lower flow pressure. However, as shown, this appears to have required ducting. The present invention with one flow path surrounding the other flow path may not need ducting between the supply flow path and the return flow path to accomplish the goals of moving or otherwise affecting the boundary layer. Thus, the boundary layer affecting element may be fluidically connected to at least one of the flow paths and generally to both of them. Until the present invention, using adjacent, surrounded, or even coaxial arrangements, it was not realized that a boundary layer opening could be placed between the supply and return without a duct. With an annulus formed by the relationship between the supply flow path and the return flow path, such an arrangement is entirely possible and perhaps preferred. This embodiment may be especially useful when at least a portion of the supply flow path is parallel aligned with a portion of the return flow path. In a preferred embodiment, the boundary layer openings could be placed in this flow area. Likewise, the reversing element could be useful in accomplishing this goal by reversing the flow between the supply and return flow paths in using the boundary layer opening in this fashion. Therefore, in the present invention the term "non-ducted" boundary layer opening is meant to exclude such requirements of ducting between the supply flow path and the return flow path as shown in FIG. 19. Naturally, some linking ducting may be beneficial between a plurality of boundary layer openings as shown in FIG. 18 that, for instance, might equalize the pressure between the various boundary layer openings. Such linking ducting is not excluded by the term "non-ducted" boundary layer opening.

Furthermore, the boundary layer openings could be adjustable. For instance, as shown in FIG. 20, the boundary layer opening could be restricted by a restrictor (42) which in FIG. 20 moves vertically (naturally, other movements are possible) by an axial actuator (40). The actuator (40) could be, for instance, a solenoid, servo motor, or other device, known to those who are skilled in the art. The actuator could be electrical and could be connected to a power supply (41). Such an adjustment therefore could be remote and could even be automatically controlled dependent upon various conditions and desired effects relative to the boundary layer.

FIG. 21 shows yet another feature of the present invention relative to filter replacement. The particular configuration of the present invention in the preferred embodiment, as shown in FIG. 1 and other figures, is especially suited to a particular type of filter replacement system. In general, this aspect is nominated a remote access and replacement filter changing element (44). Naturally, the element could comprise several subelements as part of the system. In general, the remote access and replacement filter changing element involves the ability of an operator to remotely access and replace filters in a variety of locations from a centralized location. The "remote" aspect is relative to the position of the filter in use compared to the position of the centralized location.

In one embodiment as shown in FIG. 21, the centralized location (44*a*) may have access to any number of filters which may be in a remote location. This arrangement appears especially suited to the embodiment of the air handling system as shown, for instance, in FIG. 1. In FIG. 21, the filters (24) may surround an annulus (45) formed by the relative position of the supply flow path (20) to the return flow path (12). The remote access and replacement filter changing element may allow movement, such as rotation, of the plurality of filters such that each filter may be individually accessed and replaced then moved to a next position where the next filter may be accessed and replaced. The process could typically involve moving the filter along a filter path (43) to a centralized location (44*a*), removing the filter (24), replacing the filter with a second filter, and moving the second filter (that is, typically, a new filter) to a filtering location. Generally, all the filters would be replaced at the same time.

A side view of one embodiment of the remote access and replacement filter changing element (44) is shown in FIG. 22. The filter (24) may be placed or otherwise held in position in a filter holder (44*b*). The filter holder may be attached to a plurality of filter holders such as could fit in an annulus (45). The filter holders may move on a rolling element (44*c*). A rolling element may be supported by a rolling element support (44*d*), which in turn may be fastened by a fastening element (44*e*) to some structural member of the air handling system, such as an air handling shell (44*f*). Naturally, other arrangements are possible as could be readily designed by one with skill in the art. The general intent of this aspect of the invention is to allow remote access, and thereby remote replacement, to a plurality of filters from a centralized location. Also, more than one centralized location could be appropriate in some circumstances. For instance, the movement might be limited to a portion, such as half of the desired movement, so that two centralized locations might be appropriate. Other arrangements are possible. Furthermore, the remote access and replacement filter changing element could be programmed to automatically move to certain locations by an advancing filter path element (not shown). An advancing filter path element may include an electric motor and a control circuit and, for instance, limit switches, that otherwise moves the filters sequentially to the centralized location. The embodiment shown in FIG. 21 might generally be described as a lazy Susan arrangement, that is, a revolving tray arrangement. Such a system might be described as including a closed loop system in which the filters form a continuous, or substantially continuous, line. The remote access and replacement filter changing element could also be configured such that the filters were moved around an annulus to the centralized location by sliding for instance on a track perhaps without the rolling element mentioned above.

Similarly, such a remote access and replacement filter changing element could be used in conjunction with an air handling system with a return flow path (12), a plurality of filters (24), some type of fan (14a), a supply flow path (20), an annulus (45), and could include converging filters (described above and as is shown in FIGS. 12 and 14). A key to this aspect is that the centralized location allows access to some remote filter and replacement of the remote filter from the centralized location.

While the arrangement shown in FIG. 21 is one embodiment, other embodiments are possible as seen in FIG. 23. Again, the remote access and replacement access filter changing element (44) may be particularly suited toward an annulus formed by the relative position of the supply flow path (20) and the return flow path (12). As shown in FIG. 23, as is certainly possible in FIG. 21, the supply flow path contains the annulus (45). By "annulus," it is not meant to be restricted to simply a circular arrangement, but rather any geometric shape of a space formed by the relative position of, for instance, the supply flow path to the return flow path. Thus, in FIG. 23, it might be appropriate to have four centralized locations (44a) to which remote access and replacement of the filter may be performed. In such an arrangement, for instance, a conveyor could be used to replace each straight section of filters, including the remote filters toward the end of the conveyor, at the centralized location positions shown by the arrows.

FIG. 24 shows yet another aspect of the present invention mentioned earlier that relates to conditioning the air flow and is nominated a conditioning element (46). The conditioning element is specially selected for the purposes of the present invention, from a group consisting essentially of conditioning elements affecting filtration purity and temperature. For instance, the group would include filters and coils. While this aspect may be used in a variety of applications, it appears particularly suited toward the embodiment of the air handling system such as shown in FIG. 1. There may be two aspects of this feature. A first aspect is that by positioning the conditioning element at certain angular orientations to the primary flow direction of, for instance, the return flow path, it may assist in turning the flows in an intended direction. This aspect is referred to as the pressure differential turning system. The second aspect is that by fluidicly surrounding the axial flow device (14), it may assist in resulting in a more uniform flow distribution similar to the aspects discussed above involving the filter and coil arrangements. Focusing on the pressure differential tuning system, shown in FIG. 24, this aspect may involve the return flow path (12), the air handling system generally referred as (10), and the conditioning element (48). The conditioning element (48) may be described as having a first flow surface (48a) and a second flow surface (48b) where the first flow surface may be oriented at an angle to a direction of primary flow (12a) of for instance, the return flow path, to aid in tuning the flow (50) (shown by a variety of directional arrows) and where the conditioning element is selected from the group consisting essentially of conditioning elements affecting filtration purity and temperature. For the purposes of the present invention, this aspect specifically does not include such extra or additional turning devices such as dividers, Tees, and ells of piping systems, perforated frustoconical baffles of metal, centrifugal fans, and so forth.

The inventors have discovered that by selectively placing such conditioning elements affecting the filtration purity and temperature in specific locations, the primary flow direction may be altered. While the exact cause may be unknown at this point, it is believed that as air enters the conditioning element and flows through the conditioning element a pressure differential occurs within the conditioning element. In the flow through the conditioning element, it is believed that the pressure tries to equalize so that upon exit of the conditioning element, the direction of flow may be substantially perpendicular to the exiting flow surface herein nominated a second flow surface (48b). Thus, the conditioning element may assist in making a turn in the primary flow direction with less than the typical use of normally expected turning elements such as dividers, Tees, Ells, and other such objects. The use of such normally expected objects generally may involve additional pressure losses that may not be necessary by using the described pressure differential turning system. While generally such other objects may be useful, it is believed that use of the conditioning elements to effect a pressure differential turn may allow less pressure drop in using the other objects (Tees, Ells, and so forth). If, for instance, a conditioning element is selected from the filtration purity aspect such as a filter, then typically, one of the filter surfaces may be oriented at an angle to the primary flow direction of the return flow path. This may aid in returning the flow at an intended turn (52) in the flow. Also, as mentioned above, the pressure differential turning system may also assist in providing uniform flow across the fan (14). As shown in FIG. 24, there may be multiple locations in placing one or more conditioning elements.

Yet, another possibility is to provide a conical coil or filter, such as a frustoconical coil or filter. By "frustoconical," it is generally meant to mean a three-dimensional inclined surface such as a cone, pyramid, or other shape having sloping sides. Additionally, it may have a section truncated such that a cross section dimension may be smaller at the top compared to a cross section dimension nearer the bottom. Such a frustoconical shape could be placed at inclined positions (54) or (54b) as an example.

Additionally, the conditioning element may be, for instance, cylindrically shaped and might be placed at a perpendicular orientation as shown at the perpendicular position (56) where it may be generally perpendicular to the primary flow direction (12a) of the return flow path and may additionally be perpendicular to the primary flow direction (20a) of the supply flow path. Thus, this aspect could include turning the air from a primary flow direction in a return flow path by utilizing at least one conditioning element. Obviously, multiple elements could be used. It is felt that to utilize this aspect of the present invention, at least one of the flow surfaces should be at an angle to the primary flow direction. As shown in the embodiment of FIG. 24, a reversing element (18) might be used to further accomplish the intended turn (52).

Another aspect of the present invention involves using a skewed flow face filter shown in FIG. 25. A skewed flow face filter (68) may generally be described as a polysided three dimensional configuration with at least a first flow face (68a) and a second flow face (68b) where the first flow face is skewed at some angle, θ, to the second flow face. This, naturally, may be used in an air handling system such that a skewed flow faced filter could be used in conjunction with a fan fluidicly connected to a return flow path (12) where the return flow path returns air through a return (13) as part of an air handling system and a supply flow path (20). The angle, θ, may be an acute angle, perpendicular, obtuse, or any other angle. In one embodiment as shown in FIG. 25, a first flow face (68a) may be oriented substantially perpendicular to the return flow path. With the skewed angle, θ, a second flow face may then be oriented toward a turned direction of the return flow path. It is believed that by skewing the faces, an additional aspect of turning may be accomplished by using a filter. Likewise, other elements could be similarly made such as a coil. For the present invention the preferred embodiment involves using a filter. The entering air (70) may exit at an exit direction (72) substantially perpendicular to the second face (68b) and oriented toward a turned direction. Thus, the flow may be turned to some degree by using such an element as the skewed flow face filter. As shown in FIG. 26, it may even be possible to have an extended turn. For instance, the flow from the second flow face (68b) might be oriented more towards the direction of an axial flow device (14) such as shown in FIG. 1.

FIG. 25a shows another variation of the skewed flow face filter concept. In general, the flow resistance maybe varied to change the flow distribution across the flow path. For instance, this might be across the cross sectional flow area such as an annulus. In this embodiment, the inside thickness may be greater than the outside thickness. Also, one or both surfaces may be inclined to the primary direction of the flow. In some instances, the flow may be greater in one portion of the air stream than another, such as the inner perimeter compared to the outer perimeter. By varying the thickness of the element, different effects may be made on the flow distribution. If the goal was to form a more uniform distribution and the inner perimeter had a faster flow, the inner perimeter thickness, closer to the supply flow path in this example and relative to the position of the filter in the flow path, might be thicker than the outer perimeter thickness. Also, the thickness need not vary linearly and could be for instance, stepped thicknesses, exponentially varying thicknesses or other appropriate relative thicknesses depending on the desired flow characteristics. Thus, varying the cross sectional flow rates through varying thicknesses could apply to other elements such as coils and may be generally described as varying flow resistance elements affecting filtration purity and temperature.

In a similar manner, the actual thickness might not vary, but the flow resistance per cross sectional unit area might vary and could achieve a similar result. For instance, if a coil (affecting temperature) were used, the fins could be spaced closer together to increase the flow resistance in a certain area of the flow path. Likewise, the thickness of the coil (for instance by changing the length of the fins) could also be varied so that a combination of thickness and spacing could achieve a varying flow resistance. Obviously, other combinations of thickness and flow resistance per unit area could be made to vary the flow resistance. Thus, as a general statement, the concept could include varying the flow resistance of a varying flow resistance element affecting filtration purity and temperature across a cross sectional area of a flow path.

Naturally, the skewed flow face filters and the other configurations related to it could be used for other flow devices and other applications besides just an axial flow device. FIG. 27 shows such a system. Where an intended turn (52) is desired, the skewed flow face filter may be used such that the entering flow (70) exits at a direction (72) which may assist in turning the flow. As also shown in FIG. 27, the skewed flow face filter may be used in conjunction with an inclined (inclined at angle θ) filter, such as has been described above and shown in FIG. 7. For instance, the first flow face may in itself be inclined at some angle to the primary flow direction of, for instance, the return flow path. This may lead to further turning effects. In using this type of filter to make an intended turn, such a turn could be used in conjunction with a turning element (53) shown in FIG. 27. The turning element (53) could be a typical turn such as an Ell in a piping system, a Tee intersection, or even deflectors, and so forth, as would be known to one skilled in the art.

Additionally, as depicted in FIG. 28, the skewed flow face filter may be formed in the manner of a converging filter shown in FIGS. 12–16, for instance. This might assist the skewed flow face filter's use in an annular arrangement, such as shown in FIG. 2. In general, this skewed aspect could relate to the filter by itself in which a filter element media could have a polysided, three dimensional configuration with a first and second flow face where the first flow face is skewed at an angle, θ, to the second flow face in the general direction of flow. Furthermore, it may be in advantageous to have the second flow face essentially similar or equal in surface square area as the first flow face.

The above descriptions of the various systems may be particularly appropriate for a clean room environment. A clean room environment is known to those in the art and generally can be described as an enclosed space suitable for manufacturing and testing items or substances with carefully controlled compositions. Typically, this may include producing micro chips, high purity chemical compositions, testing facilities, and so forth. Therefore, a filtered clean room with at least some of the goals of the present invention, should include such an enclosed space, an air handling system fluidicly connected to the enclosed space, a return flow path for air to return to the air handling system, a reversing element fluidicly connected to a return flow path, an axial flow device fluidicly connected to the reversing element, a supply flow path where some portion of the supply flow path is substantially parallel with the return flow path and fluidicly connected to the axial flow device where one of the flow paths is at least partially surrounded by the other flow path, and a filter to filter contaminants from the air and fluidicly connected to the air handling system. Naturally, the above goals, objects, and descriptions could, therefore, also apply to the clean room environment.

Such an application might be shown in FIG. 29, using, generally speaking, the above described air handling systems (10). It may be generally mounted on a supporting surface (82) such as a roof above the enclosed space (80). Because flow rates are typically so high (usually 60–80 CFM per square foot) in a clean room environment, typically multiple units are used. This is also shown in FIG. 29. The air may flow through a supply flow path in the ceiling and enter the enclosed space through some opening at a grill or other such device known to those in the art. It typically then flows downward and exits through openings such as a floor grill. The return air typically then mixes with various contaminants throughout the clean room and flows through a bank of filters (83) to filter all the contaminants. This air is then returned generally up to the multiple air handling systems (10). The above air handling system including the different goals and objects described herein could work with such a system. However, an additional aspect of the present invention includes improvements over the standardized bank of filters which filter multiple contaminants.

Because of the general undivided zones (that is without physical separations) of clean rooms, the present state of art is to combine the air and filter the mixed air for the various contaminants in the undivided zones of a clean room. By filtering a multiple of contaminants through a bank of filters, inefficiencies occur. First, the air passing through multiple filters incurs additional pressure losses that may be unnecessary. For instance, as shown in FIG. 29, if there are three zones, each containing a contaminant nominated A, B, and C, the air containing contaminant A would have to also pass through the filtering requirements for contaminants B and C. This would likewise occur for elements B and C having to pass through the other corresponding filtering elements. This accepted arrangement may lead to waste and excess pressure loss. The filtering elements may include not only particulate filters but chemical filters which absorb the various chemical contaminants in the clean room. An additional inefficiency is realized by such a bank of filters in that some of the filters might become saturated and of little use while other filters might still be able to filter the particular contaminant. However, in a typical maintenance procedure, the entire bank may be replaced. Thus, inefficiencies and waste occur.

The inventors of this patent have realized that it is possible to avoid such waste and additional pressure drop by utilizing a system less dependent in a bank of filters for all the zones. Such an embodiment of this concept is shown in FIG. 30. Two aspects are shown. One aspect relates to filtering air from undivided zones. The other aspect relates to filtering from divided zones. These aspects appear particularly suited toward a multi-zoned clean room of an enclosed space (80).

Heretofore, the difficulty with selectively filtering specific undivided zones is that there appeared to be cross-contamination by a cross-migration (86) of contaminants between undivided zones. Thus, the common solution is to provide partitions (100) of some type to separate the different contaminant zones. For the purpose of the present invention, a "zone" is defined as an area space containing primarily one principal contaminant. For example, in FIG. 30, there are three zones. First zone (88), containing a first contaminant A, is separate from a second undivided zone (90), containing second contaminant B. A third zone is a divided zone (98), containing contaminant C.

The inventors have realized that by reducing the cross-migration (86) of contaminants, new possibilities arise in filtering the contaminants. By minimizing the cross-migration, the main flow (84) may be filtered through a separate filter before the air is combined with other zones, such as before the air is returned to the air handling units (10). This may be induced by laminar flow of the air through the zone. Such a filter, for instance, could be located below the floor openings to receive the supply air and filter the air. For instance, filter (89) might be particularly selected to filter the undivided zone contaminant A, whereas filter (91) might be selected to particularly filter the undivided zone (90) containing the contaminant B. Obviously, the filters (89) and (91) could be placed at other positions as might be appropriate. For instance, they could be placed closer to the supply flow path exiting from the fan or in the duct (22) supplying air to the undivided zone. Likewise, each undivided zone could have a zone specific air handling system return flow path and supply flow path. mixing, if any, might occur in the enclosed air space as cross-migration is minimized.

Thus, this aspect might generally be described as a clean room undivided zone air filtering system including a return flow path to return air to an air handling system, an air handling system to flow the air, a supply flow path to flow the air to at least one of a plurality of undivided zones of a clean room, and a filtration system adapted to filter a predetermined first contaminant and the undivided zone where the first contaminant is different than a predetermined second contaminant in at least one other undivided zone. As shown in FIG. 29, naturally, a second filtration system could be included to filter the second undivided zone independently of the first contaminant. By "independently," it is meant that the filtering system could be selectively filtering the contaminant B without regard to filtering contaminant A. Naturally, the contaminants could be of a chemical nature. As part of this system, a feature could include filtering the air from a zoned return flow path before the air mingles with other zones. Likewise, the supply flow path could also be zoned such that air is filtered before it mingles with air from other zones. To assist in reducing cross-migration, at least one cross-migration reduction element may be incorporated into the system to reduce cross-migration of air from one undivided zone to another undivided zone in the clean room. Further, the sufficient volume of air could be provided and, furthermore, could be controlled with various controls to reduce cross-migration and could include a pressure balancing element in each zone shown in FIG. 30 is (92, 94, and 96). For instance, a crossmigration element might include a pressure balancing element that would assist in balancing pressures between the first undivided zone (88) and the second undivided zone (90). The pressure balancing element may be an adjustable air diffuser or damper. To assist in reducing cross-migration, a sufficient volume of air may be helpful such that the volume may primarily flow in the direction vertically as shown in FIG. 30 of the main flow (84) in each zone.

FIGS. 31 and 32 show variations of the embodiment of FIG. 30. For simplicity, the enclosed air space (90) as shown as two undivided zones, a first undivided zone (88) and a second undivided zone (89) having a first contaminant A and a second contaminant B, respectively. By providing a partition between the air handling system supply flow path and return flow path, separate filtration may occur as the cross-migration (86) is minimized. As shown, therefore, the air handling system (10), return flow path, and supply flow path of undivided zone (88) may be separate from the air handling system and supply and return flow paths of undivided zone (89). This might allow, for instance, a variety of locations for the filter elements (89) and (91).

FIG. 32 also shows that the above-described goals, objects, and descriptions of the various inventive aspects of the present invention, may be used in conjunction with such a system for the clean room. The goal of clean rooms is that there should be generally little cross-migration or horizontal transfer of air or contaminants between zones of a clean space. Therefore, generally a contaminant picked up within the clean space is transported in a return air system in order to reach other zones of the clean space. The return air can be filtered either as it leaves the clean space (and before it is mixed) or in the air handling system before it is supplied to the clean room. A problem with filtering the return air before mixing (as in subfloor filters) is that the additional flow resistance may tend to distort the vertical flow with the clean space and affect the cross-migration between zones. Thus, a preferred place for filters, such as chemical filters, may be in the air handling system itself. This may lessen the effect on the cross-migration aspect and may provide ready access for maintenance. Such a position is shown in FIG. 32. For instance, the undivided zone (88) may incorporate in an air handling system the skewed flow face filter (68), a reversing element (18), an axial flow device (14), and so forth. Likewise, by way of example only, the undivided zone (89) may incorporate a filter (24) which may be inclined, trapezoidal, or other combinations. For the zone specific system, it could generally include returning the air or supplying the air relative to the same zone instead of mingling with air from other zones. With the generally compact structure of the preferred embodiment of FIG. 1, the clean room may allow even more multiple units and more isolation of smaller zones.

A further aspect of the zoned filtration may involve a variation such as is shown in FIG. 33. In some instances, mixing of return air may be inconsequential. Thus, divided return flow paths may not be appropriate and mixing could occur after the air flows through the clean space. Furthermore, when supplying this mixed air to certain areas including zones, only certain contaminants may be harmful. Thus, a selective filtration may occur for a particular contaminant while allowing other contaminants to pass through the supply flow path into the zone or clean space. It might be economical and appropriate to place the filtration system in the specific return flow path to the specific supply flow path to accomplish this selective filtration. An example is shown in FIG. 33. For instance, undivided zone (88) may produce contaminants A, B, and C and undivided zone (89) may produce contaminants C and D. The typical installation, prior to the present invention, could have a bank of filters that could filter contaminants A–D. However, as discussed above, this appears unnecessary. In this example, the return flow paths could be combined and then filtered later when the air is about to flow through the supply flow paths to the specific zone. In zone (88), contaminant A might be hazardous and could be removed, but it might be acceptable to have contaminant B and C remain. Thus, with selective filtration, contaminants A and D could be removed. Similarly, in zone (89), contaminant A (because of health reasons) may need removal and contaminant B (because of processing constraints) may need removal. Thus, selective filtration of contaminants A and B in zone (89) may be appropriate. Filtration requirements might be reduced by 50% (in this example) with respect to contaminants B and D between the two zones. Such an arrangement may lead to significant savings.

A further aspect of the present invention regarding clean rooms is also shown in FIG. 30. FIG. 30 in zone (98) is a divided zone having a partition (100). The divided zone (98) generally has a contaminant This may be, for instance, a chemical contaminant C. The present state of the art for clean rooms may be seen in FIG. 29 in which even in a divided clean room, the return air could be filtered through the bank of filters (83). For filtering chemical contaminants, it is believed that prior to the present invention no zone specific chemical filtration occurred, whether divided or undivided. Thus, the present invention includes a clean room with a zone (whether divided or undivided), an air handling system to flow air, a return flow path to return air to the air handling system, a supply flow path to flow the air to at least one of the plurality of zones in a given clean room, and a chemical filtration system adapted to filter a predetermined first chemical contaminant in the zone (whether divided or undivided) of the clean room where the first chemical contaminant is different than a predetermined second contaminant in at least one of the other zones of the clean room. Similar to the preceding description of the chemical room, this aspect could include a second filtration system to filter a second zone, whether divided or undivided, independently of the first chemical contaminant. Likewise, the system could include a zoned specific return flow path, supply flow path, or air handling system, or combination thereof so that air was chemically filtered before mingling with other zones. Similarly, the above features of the present invention such as the reversing element, converging filter, skewed flow filter, one flow path being surrounded by the other flow path and other features could apply to this part of the invention as well.

Each of these embodiments could include various facets of the present invention. Some may include filters, coils, reversing elements, while others may not include such elements. Some may include varieties of axial flow devices and others may relate to systems for generally fans. The market place and manufacturing concerns may dictate the appropriate embodiments for the present invention.

The foregoing discussion and the claims that follow describe only the preferred embodiments of the present invention. Particularly with respect to the claims, it should be understood that a number of changes may be made without departing from the essence of the present invention. In this regard, it is intended that such changes—to the extent that they substantially achieve the same results in substantially the same way—will still fall within the scope of the present invention.

Although the methods related to the system are being included in various detail, only initial claims directed toward the supply flow path surrounded by return flow path have been included in various detail. Naturally, those claims could have some application to the various other methods and apparatus claimed throughout the patent. Naturally, the disclosure of the system or method context is sufficient to support the full scope of methods and apparatus claims with, for instance, the clean room, the undivided zone filtration system, the chemical zone filtration system, the converging filter system, the skewed face filter system and its various filters, the pressure differential turning aspects, the non-ducted boundary layer openings, and the remote access and replacement filter changing element. While these may be added to explicitly include such details, the existing claims may be construed to encompass each of the other general aspects. Without limitation, the present disclosure should be construed to encompass subclaims, some of those presented in a system or method context as described above for each of the other general aspects. In addition, to the extent of any revisions utilize the essence of the invention, each would naturally fall within the breadth of protection encompassed by this patent. This is particularly true for the present invention since its basic concepts and understandings may be broadly applied.

It is simply not practical to describe in the claims all the possible embodiments to the present invention which may be accomplished generally in keeping with the goals and objects of the present invention and this disclosure and which may include separately or collectively such aspects as described in the goals and objects found throughout the description of the patent. While these may be added to explicitly include such details, the existing claims should be construed to encompass such aspects. To the extent the methods claimed in the present invention are not further discussed, they are natural outgrowths of the system or apparatus claims. Therefore, separate and further discussion of the methods are deemed unnecessary as they otherwise claim steps that are implicit in the use and manufacture of the system or the apparatus claims. Furthermore, the steps are organized in a more logical fashion; however, other sequences can and do occur. Therefore, the method claims should not be construed to include only the order of the sequence and steps presented.

Furthermore, any references mentioned in the application for this patent as well as all references listed in any information disclosure originally filed with the application are hereby incorporated by reference in their entirety to the extent such may be deemed essential to support the enablement of the invention(s). However, to the extent statements might be considered inconsistent with the patenting of this/these invention(s), such statements are expressly not to be considered as made by the applicant(s).

We claim:

1. A method of handling high velocity air in an air handling system comprising the steps of:
   a. providing a high velocity, confined and directed return flow path for a high velocity flow of air to an air handling system;
   b. utilizing a high velocity, confined reversing element path which is adapted to affirmatively reverse said high velocity flow of air into a high velocity supply flow;
   c. providing a high axial velocity axial flow device fluidicly connected to said high velocity supply flow path;
   d. aligning at least a portion of said high velocity supply flow path substantially parallel to said high velocity, confined and directed return flow path;
   e. fluidicly connecting said high velocity supply flow path to said high axial velocity axial flow device; and
   f. at least partially surrounding one of said high velocity flow paths with the other high velocity flow path.

2. A method of handling air in an air handling system as described in claim 1 further comprising the step of arranging said supply flow path between symmetrical returns.

3. A method of handling air in an air handling system as described in claim 1 further comprising the step of arranging said supply flow path between multiaxial returns.

4. A method of handling air in an air handling system as described in claim 1 wherein said step of at least partially surrounding one of said flow paths with the other flow path further comprises the step of at least partially surrounding said supply flow path with said return flow path.

5. A method of handling air in an air handling system as described in claim 1 wherein said step of at least partially surrounding one of said flow paths with the other flow path further comprises the step of at least partially surrounding said return flow path with said supply flow path.

6. A method of handling air in an air handling system as described in claim 1 wherein said step of at least partially surrounding one of said flow paths with the other flow path further comprises the step of substantially enclosing said supply flow path with said return flow path.

7. A method of handling air in an air handling system as described in claim 1 wherein said step of at least partially surrounding one of said flow paths with the other flow path further comprises the step of substantially enclosing said return flow path with said supply flow path.

8. A method of handling air in an air handling system as described in claim 1 further comprising the step of uniformly providing said flow to said axial flow device.

9. A method of handling air in an air handling system as described in claim 1 further comprising the step of coaxially arranging said supply flow path with said return flow path.

10. A method of handling air in an air handling system as described in claim 1 further comprising the step of fluidicly connecting at least one filter with said axial flow device.

11. A method of handling air in an air handling system as described in claim 10 further comprising the step of inclining said filter to a primary flow direction in at least one of said flow paths.

12. A method of handling air in an air handling system as described in claim 10 further comprising the step of utilizing a converging filter.

13. A method of handling air in an air handling system as described in claim 12 further comprising the step of inclining said converging filter to a primary flow direction in at least one of said flow paths.

14. A method of handling air in an air handling system as described in claim 12 further comprising the step of utilizing a trapezoidal filter.

15. A method of handling air in an air handling system as described in claim 10 further comprising the step of fluidicly surrounding said axial flow device with said filter to assist in establishing uniform air flow to said axial flow device.

16. A method of handling air in an air handling system as described in claim 1 further comprising the step of fluidicly surrounding said axial flow device with a coil to assist in establishing uniform air flow to said axial flow device.

17. A method of handling air in an air handling system as described in claim 15 further comprising the step of fluidicly surrounding said axial flow device with a coil to assist in establishing uniform air flow to said axial flow device.

18. A method of handling air in an air handling system as described in claim 16 further comprising the step of arranging said coil perpendicular to a primary flow direction of said supply flow path and said return flow path.

19. A method of handling air in an air handling system as described in claim 16 further comprising the step of inclining said coil to a primary flow direction in at least one of said flow paths.

20. A method of handling air in an air handling system as described in claim 16 further comprising the step of providing a frustoconical coil.

21. A method of handling air in an air handling system as described in claim 18 further comprising the step of providing a filter to filter said flow of air.

22. A method of handling air in an air handling system as described in claim 21 further comprising the step of inclining said filter to a primary flow direction in at least one of said flow paths.

23. A method of handling air in an air handling system as described in claim 1 further comprising the steps of:
   a. utilizing a converging filter;
   b. arranging a coil perpendicular to a primary flow direction of said supply flow path and said return flow path; and
   c. fluidicly surrounding said axial flow device with said coil.

24. A method of handling air in an air handling system as described in claim 23 further comprising the step of inclining said filter to a primary flow direction in at least one of said flow paths.

25. A method of handling air in an air handling system as described in claim 17 further comprising the step of providing a frustoconical coil.

26. A method of handling air in an air handling system as described in claim 1 further comprising the step of adjusting the blade pitch of said axial flow device.

27. A method of handling air in an air handling system as described in claim 1 further comprising the step of providing a boundary layer affecting element.

28. A method of handling air in an air handling system as described in claim 27 wherein said step of providing a boundary layer affecting element comprises the step of providing a flow splitter.

29. A method of handling air in an air handling system as described in claim 27 wherein said step of providing a boundary layer affecting element comprises the step of providing a boundary layer opening.

30. A method of handling air in an air handling system as described in claim 1 further comprising the step of locating at least one boundary layer opening between said return flow path and supply flow path and spacing said boundary layer opening around said supply flow path.

31. A method of handling air in an air handling system as described in claim 1 further comprising the step of locating at least one non-ducted boundary layer opening at an interface between said return flow path and supply flow path.

32. A method of handling air in an air handling system as described in claim 31 further comprising the step of adjusting said boundary layer opening.

33. A method of handling air in an air handling system as described in claim 1 further comprising the step of providing a plurality of filters and the step of providing a remote access and replacement filter changing element to change said plurality of filters from a centralized location.

34. A method of handling air in an air handling system as described in claim 33 wherein said step of providing a remote access and replacement filter changing element comprises the step of providing a lazy Susan arrangement.

35. A method of handling air in an air handling system as described in claim 34 wherein said step of providing a lazy Susan arrangement comprises the step of providing a filter holder, a rolling element supporting said filter holder, a rolling element support, and a fastening element to fasten said rolling element support to said air handling system.

36. A method of handling air in an air handling system as described in claim 21 further comprising the step of providing a plurality of filters and a remote access and replacement filter changing element to change said plurality of filters from a centralized location.

37. A method of handling air in an air handling system as described in claim 36 further comprising the step of providing at least one conditioning element having a first flow surface and a second flow surface wherein at least one of said surfaces of said conditioning element is oriented at an angle to a direction of primary flow of said return flow path to aid in affirmatively reversing said flow and wherein said conditioning element is selected from the group consisting essentially of conditioning elements affecting filtration purity and temperature.

38. A method of handling air in an air handling system as described in claim 33 the step of arranging said supply flow path and said return flow path to provide an annulus between said supply flow path and said return flow path.

39. A method of handling air in an air handling system as described in claim 38 further comprising the step of utilizing a converging filter.

40. A method of handling air in an air handling system as described in claim 1 further comprising the step of orienting makeup air flow to assist in affirmatively reversing said air to said axial flow device.

41. A method of handling air in an air handling system as described in claim 1 further comprising the step of providing at least one conditioning element having a first flow surface and a second flow surface wherein at least one of said surfaces of said conditioning element is oriented at an angle to a direction of primary flow of said return flow path to aid in affirmatively reversing said flow and wherein said conditioning element is selected from the group consisting essentially of conditioning elements affecting filtration purity and temperature.

42. A method of handling air in an air handling system as described in claim 10 further comprising the step of providing at least one conditioning element having a first flow surface and a second flow surface wherein at least one of said surfaces of said conditioning element is oriented at an angle to a direction of primary flow of said return flow path to aid in affirmatively reversing said flow and wherein said conditioning element is selected from the group consisting essentially of conditioning elements affecting filtration purity and temperature.

43. A method of handling air in an air handling system as described in claim 41 further comprising the step of orienting at least one filter at an angle to said primary flow direction of said return flow path to aid in affirmatively reversing said flow at an intended turn in said flow.

44. A method of handling air in an air handling system as described in claim 43 further comprising the step of orienting said filter at an acute angle.

45. A method of handling air in an air handling system as described in claim 41 further comprising the step of orienting at least one coil at an angle to said primary flow direction of said return flow path to aid in affirmatively reversing said flow at an intended turn in said flow.

46. A method of handling air in an air handling system as described in claim 45 further comprising the step of providing a frustoconical coil.

47. A method of handling air in an air handling system as described in claim 45 further comprising the step of orienting said coil perpendicular to said primary flow direction of said return flow path and said supply flow path.

48. A method of handling air in an air handling system as described in claim 1 further comprising the step of providing a skewed flow face filter.

49. A method of handling air in an air handling system as described in claim 47 further comprising the step of locating said skewed flow face filter in the proximity of a reversing element.

50. A method of handling air in an air handling system as described in claim 47 further comprising the step of providing a first and second flow face of said skewed flow face filter and providing a first face at an acute angle to said second face.

51. A method of handling air in an air handling system as described in claim 47 further comprising the step of providing a first and second flow face of said skewed flow face filter and providing a first face at a substantially perpendicular angle to said second face.

52. A method of handling air in an air handling system as described in claim 47 wherein said skewed flow face filter comprises a first flow face and further comprising the step of orienting said first flow face substantially perpendicular to a primary flow direction of said return flow path.

53. A method of handling air in an air handling system as described in claim 48 wherein said skewed flow face filter comprises a first flow face and a second flow face and further comprising the step of orienting said second flow face toward a turned direction of said return flow path.

54. A method of handling air in an air handling system as described in claim 52 wherein said skewed flow face filter further comprises a second flow face and further comprising the step of orienting said second flow face toward a turned direction of said return flow path.

55. A method of handling air in an air handling system as described in claim 48 further comprising the steps of:
 a. providing a reversing element in said air handling system; and
 b. orienting a second flow face of said skewed flow face filter, having a first and second face, toward a turned direction of said reversing element.

56. A method of handling air in an air handling system as described in claim 55 further comprising the step of providing substantially similar square areas of said first and second flow faces.

57. A method of handling air in an air handling system as described in claim 48 further comprising the step of providing substantially similar square areas of said first and second flow faces.

58. A method of handling air in an air handling system as described in claim 12 further comprising the step of providing a skewed flow face filter.

59. A method of handling high velocity air in an air handling system as described in claim 1 wherein said step of providing a high axial velocity axial flow device fluidicly connected to said high velocity supply flow path comprises the step of providing a high axial velocity axial flow device for flows of at least about 3000 FPM.

60. A method of handling high velocity air in an air handling system as described in claim 1 wherein said step of utilizing a high velocity, confined reversing element path which is adapted to affirmatively reverse said high velocity flow of air into a high velocity supply flow comprises the step of utilizing a high velocity air turning path which is adapted to affirmatively turn and reverse said flow of air into a high velocity supply flow.

61. A method of handling high velocity air in an air handling system as described in claim 59 wherein said step of utilizing a high velocity air turning path which is adapted to affirmatively turn and reverse said flow of air into a high velocity supply flow comprises the step of utilizing a high velocity air turning path which is adapted to smoothly and affirmatively turn and reverse said flow of air into a high velocity supply flow.

62. A method of handling high velocity air in an air handling system as described in claim 1 wherein said step of utilizing a high velocity, confined reversing element path which is adapted to affirmatively reverse said high velocity flow of air into a high velocity supply flow comprises the step of utilizing a non-diverting high velocity, confined reversing element path which is adapted to affirmatively reverse said high velocity flow of air into a high velocity supply flow without substantially diverting air away from said other high velocity flow path.

* * * * *